United States Patent [19]

Imai et al.

[11] 4,408,279
[45] Oct. 4, 1983

[54] METHOD AND APPARATUS FOR ADJUSTING THE SUPPLY OF FUEL TO AN INTERNAL COMBUSTION ENGINE FOR AN ACCELERATION CONDITION

[75] Inventors: Masumi Imai; Kotaro Hirasawa, both of Hitachi, Japan

[73] Assignee: Hitachi, Ltd., Tokyo, Japan

[21] Appl. No.: 73,085

[22] Filed: Sep. 6, 1979

[30] Foreign Application Priority Data

Sep. 6, 1978 [JP] Japan ................................ 53-108608

[51] Int. Cl.³ ....................... F02M 51/00; F02B 3/02; G06F 15/20
[52] U.S. Cl. ................. 364/431.05; 123/486; 123/492
[58] Field of Search .............. 364/431, 442; 123/422, 123/480, 453, 486, 463, 489, 492

[56] References Cited

U.S. PATENT DOCUMENTS

| | | | |
|---|---|---|---|
| 3,969,614 | 7/1976 | Moyer et al. ..................... | 364/431 |
| 4,010,717 | 3/1977 | Taplin ............................... | 123/492 |
| 4,126,107 | 11/1978 | Harada et al. .................... | 123/492 |
| 4,148,283 | 4/1979 | Harada et al. .................... | 123/492 X |
| 4,159,697 | 7/1979 | Sweet ................................ | 123/492 |
| 4,163,282 | 7/1979 | Yamada et al. ................... | 364/431 |
| 4,176,629 | 12/1979 | Kawai et al. ..................... | 123/486 X |
| 4,184,458 | 1/1980 | Aoki et al. ........................ | 123/492 |
| 4,184,461 | 1/1980 | Leung .............................. | 123/492 |
| 4,244,023 | 1/1981 | Johnson ............................ | 364/431 |

FOREIGN PATENT DOCUMENTS 54-130734 10/1979 Japan ................................ 364/431

*Primary Examiner*—Felix D. Gruber
*Attorney, Agent, or Firm*—Craig and Antonelli

[57] ABSTRACT

For controlling an internal combustion engine for the acceleration of an automobile, a change in the amount of air passing through an intake manifold is detected and a correction for the fuel injection time is performed on the basis of the change. After the amount of air has reached a substantially constant value, the corrective control is continued for a certain period of time.

18 Claims, 32 Drawing Figures

FIG. 6

| STAGE PULSE | STAGE CTR ||||||||||
|---|---|---|---|---|---|---|---|---|---|---|
| | $C_9$ | $C_8$ | $C_7$ | $C_6$ | $C_5$ | $C_4$ | $C_3$ | $C_2$ | $C_1$ | $C_0$ |
| INTL-P | X | X | X | X | X | X | X | 0 | 0 | 1 |
| CYL-P | X | X | X | X | X | X | X | 0 | 1 | 0 |
| ADV-P | X | X | X | X | X | X | X | 0 | 1 | 1 |
| DWL-P | X | X | X | X | X | X | X | 1 | 0 | 0 |
| RPM-P | X | X | X | X | X | X | X | 1 | 0 | 1 |
| VSP-P | X | X | X | X | X | X | X | 1 | 1 | 0 |
| RPMW-P | X | X | X | 0 | 0 | 1 | 0 | 0 | 0 | 0 |
| EGRP-P | X | X | 0 | 0 | 1 | 1 | 0 | 0 | 0 | 0 |
| EGRD-P | X | X | 1 | 0 | 1 | 1 | 0 | 0 | 0 | 0 |
| NIDLP-P | X | X | 0 | 1 | 0 | 1 | 0 | 0 | 0 | 0 |
| NIDLD-P | X | X | 1 | 1 | 0 | 1 | 0 | 0 | 0 | 0 |
| ENST-P | 0 | 1 | 0 | 0 | 0 | 0 | 0 | 0 | 0 | 0 |
| VSPW-P | 1 | 0 | 0 | 0 | 0 | 0 | 0 | 0 | 0 | 0 |
| INTV-P | 1 | 1 | 0 | 0 | 0 | 0 | 0 | 0 | 0 | 0 |
| INTVR-P | 0 | 0 | 0 | 0 | 0 | 0 | 0 | 0 | 0 | 0 |
| INJ-P (IF TREG=000) | X | X | X | X | X | X | X | 1 | 1 | 1 |
| INJ-P (IF TREG=001) | X | X | X | X | X | X | 0 | 1 | 1 | 1 |
| INJ-P (IF TREG=010) | X | X | X | X | X | 0 | 0 | 1 | 1 | 1 |
| INJ-P (IF TREG=011) | X | X | X | X | 0 | 0 | 0 | 1 | 1 | 1 |
| INJ-P (IF TREG=100) | X | X | X | 0 | 0 | 0 | 0 | 1 | 1 | 1 |
| INJ-P (IF TREG=101) | X | X | 0 | 0 | 0 | 0 | 0 | 1 | 1 | 1 |
| STAGE0-P | X | X | X | X | X | X | X | 0 | 0 | 0 |
| STAGE7-P | X | X | X | X | X | X | X | 1 | 1 | 1 |

METHOD AND APPARATUS FOR ADJUSTING THE SUPPLY OF FUEL TO AN INTERNAL COMBUSTION ENGINE FOR AN ACCELERATION CONDITION

BACKGROUND OF THE INVENTION

This invention relates generally to a control apparatus and a method for controlling an internal combustion engine and particularly to a method for controlling the amount of fuel to be injected into the internal combustion engine when the automotive vehicle is accelerated.

In a conventional internal combustion engine, a fuel injection valve is controlled to open for a predetermined period of time under the condition of normal running of the automotive vehicle in synchronism with a signal detected by means of a crank angle sensor. The fuel injection performed during normal running of the vehicle is hereinafter referred to as normal fuel injection. When an automotive vehicle is accelerated, it is desirable to increase the amount of injected fuel as compared with the normal running. This fuel injection performed during acceleration is hereinafter referred to as corrective fuel injection.

Corrective fuel injection has heretofore been performed at the time when a throttle switch has changed from the "on" state to the "off" state, that is, when the throttle valve has changed from the fully closed state to an open state. This is called after-idling correction.

Corrective fuel injection has been also conducted when a full power switch is in the "on" state, that is, when the throttle valve is in the fully open state. This is usually called full power correction.

However, the conventional methods of the corrective fuel injection are unsatisfactory for improving the acceleration performance of the internal combustion engine.

SUMMARY OF THE INVENTION

An object of the present invention resides in providing an apparatus and a method for controlling corrective fuel injection so as to enhance the acceleration performance of the internal combustion engine.

According to one feature of the present invention, the fuel injection time for acceleration correction is determined in correspondence with the increment of the air flow per unit time. This increment corresponds to the opening degree of the throttle valve, which will meet with the degree of acceleration desired by the driver.

Another feature of the present invention resides in that the corrective fuel injection is performed even after the air flow has reached a substantially constant value in consideration of the fact that the time constant of the engine revolution velocity with respect to air flow is relatively large.

Other objects, features and advantages of the present invention will become more apparent from a detailed description of embodiments of the invention when read in conjunction with the drawings.

BRIEF DESCRIPTION OF THE DRAWINGS

FIG. 6 is a table showing the relation between stage pulses and the contents of a stage counter;

FIG. 10 shows a schematic diagram of an output register group of the input/output unit;

DETAILED DESCRIPTION OF THE PREFERRED EMBODIMENTS

Figure 1:
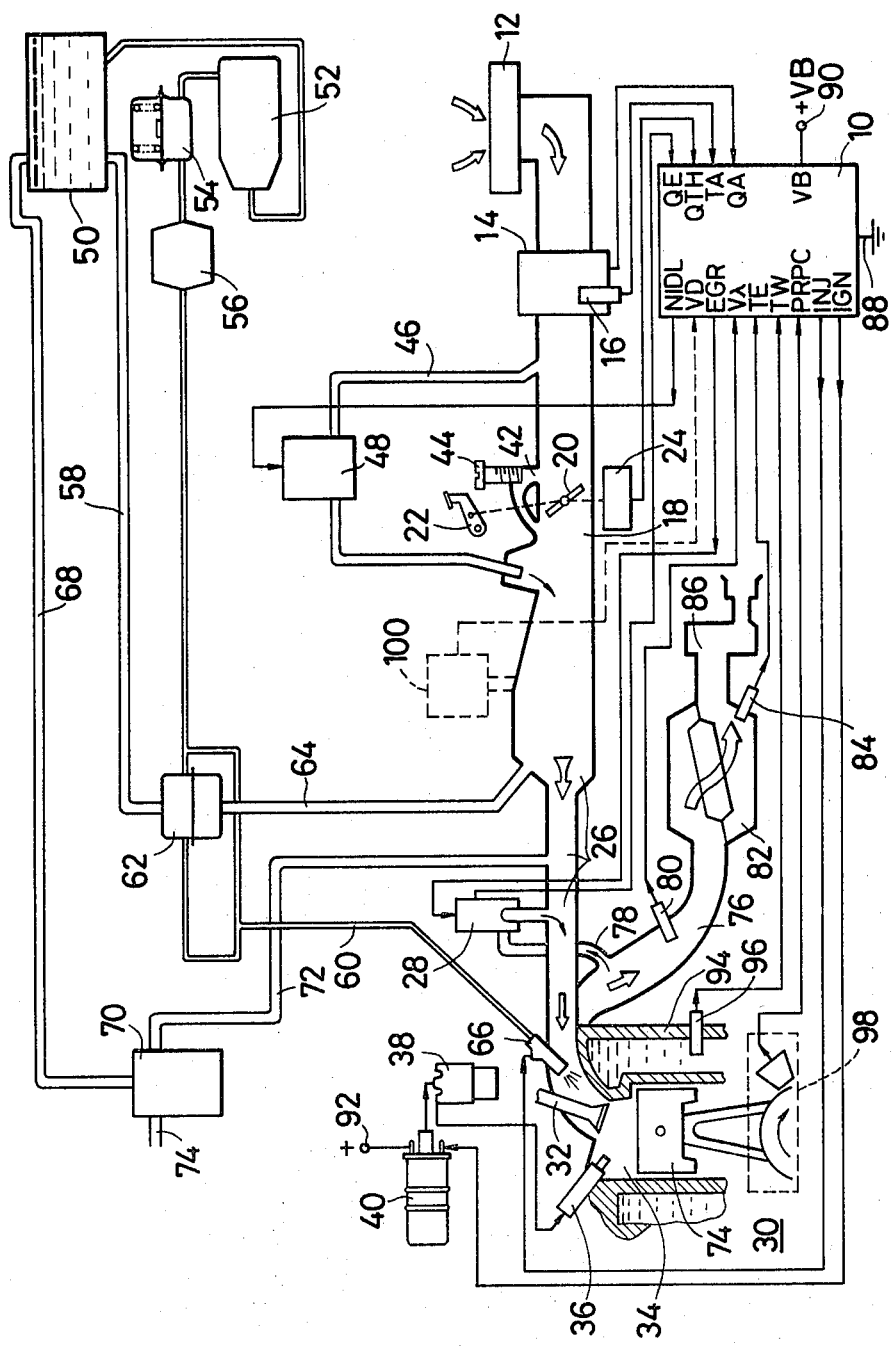
FIG. 1 is a diagram showing an engine control system for a fuel-injected, internal combustion engine.

An embodiment of this invention will now be described with reference to FIG. 1 showing a system diagram of an electronic engine control apparatus. Air taken in through an air cleaner 12 has its flow rate measured by an air flow meter 14, from which an output signal QA representative of the quantity of flow of the air is supplied to a control circuit 10. The air flow meter 14 is provided with a temperature sensor 16 for detecting the temperature of the suction air, and an output signal TA representative of the temperature of the suction air is also supplied into the control circuit 10.

The air having passed through the air flow meter 14 passes through a throttle chamber 18, and is sucked or drawn in from an intake manifold 26 through a suction valve 32 into a combustion chamber 34 of an engine 30. The quantity of air to be drawn in into the combustion chamber 34 is controlled by varying the degree of opening of a throttle valve 20 disposed within a throttle chamber in mechanical connection with an accelerator pedal 22. The angular position of the throttle valve 20 is detected by a throttle position detector 24. A signal QTH representative of the position of the throttle valve 20 is supplied from the throttle position detector 24 to the control circuit 10.

The throttle chamber 18 is provided with a bypass passage 42 for idling and an idle adjust screw 44 for adjusting the quantity of air to pass through the bypass passage 42. Where the engine is operating in the idling state, the throttle valve 20 is fully closed. The suction air from the air flow meter 14 flows through the bypass passage 42, and is drawn in into the combustion chamber 34. Accordingly, the quantity of suction air in the idling operation state is varied by the adjustment of the idle adjustment screw 44. Since energy to be generated in combustion chamber 34 is substantially determined by the quantity of air from the bypass passage 42, the engine revolution velocity in the idling state can be adjusted to an appropriate value by adjusting the idle adjustment screw 44, thus varying the quantity of suction air into the engine.

The throttle chamber 18 is further provided with another bypass passage 46 and an air regulator 48. The air regulator 48 controls the quantity of air to pass through the passage 46 in response to an output signal NIDL from control circuit 10, to control the engine revolution velocity during engine warm-up and the supply of appropriate quantity of air to the engine for a sudden change of the throttle valve 20. If necessary, the flow rate of air during the idling operation can also be varied.

Now, the fuel feed system will be described. Fuel stored in a fuel tank 50 is drawn into a fuel pump 52, and is fed under pressure to a fuel damper 54. The fuel damper 54 absorbs the pressure pulsation of the fuel from the fuel pump 52 so as to feed fuel of a predetermined pressure to a fuel pressure regulator 62 through a fuel filter 56. The fuel from the fuel pressure regulator 62 is fed under pressure to a fuel injector 66 through a fuel pipe 60. In response to an output signal INJ from the control circuit 10, the fuel injector 66 is opened to inject the fuel into the engine.

The quantity of fuel injected from the fuel injector 66 is determined by the valve opening time of the injector 66 and the difference between the pressure of the fuel fed under pressure to the injector 66 and the pressure of the intake manifold 26 into which the fuel is injected. It is desirable, however, that the quantity of fuel injection from the fuel injector 66 depend only on the valve opening time which is determined by the signal from the control circuit 10. Therefore, the pressure of the fuel fed to the fuel injector 66 is controlled by the fuel pressure regulator 62 so that the difference between the fuel pressure to the fuel injector 66 and the manifold pressure of the intake manifold 26 may be constant at all times. The intake manifold pressure is coupled to the fuel pressure regulator 62 through a pressure conduit 64. When the fuel pressure in the fuel pipe 60 becomes a certain value higher than this intake manifold pressure, the fuel pipe 60 and a fuel return pipe 58 communicate with each other, and fuel corresponding to the excess pressure is returned to the fuel tank 50 through the fuel return pipe 58. In this way, the difference between the fuel pressure in the fuel pipe 60 and the manifold pressure in the intake manifold 26 is always held constant.

The fuel tank 50 is further provided with a pipe 68 and a canister 70 for absorbing gases with the vaporized fuel. During the operation of the engine, air is drawn in from an atmospheric air port 74, and the absorbed fuel gas is fed to the intake manifold 26 by a pipe 72 and then to the engine 30.

As explained above, fuel is injected from the fuel injector, and the suction valve 32 is opened in synchronism with the motion of a piston 74, so that a mixture consisting of the air and the fuel is led to the combustion chamber 34. The mixture is compressed and is ignited by spark energy from an ignition plug 36, whereby the combustion energy of the mixture is converted into kinetic energy for moving the piston.

The burnt mixture is emitted from an exhaust valve (not shown) through an exhaust pipe 76, a catalytic converter 82, and a muffler 86 to the atmosphere as exhaust gas. The exhaust pipe 76 is provided with an exhaust gas recirculation pipe 78 (hereinbelow abbreviated to EGR pipe), through which part of the exhaust gas is led to the intake manifold 26. That is, part of the exhaust gas is returned to the suction side of the engine. The quantity of recirculated gas is determined by the valve opening degree of an exhaust gas recirculator 28. The valve opening degree is controlled by an output signal EGR of the control circuit 10. Further, the valve position of the exhaust gas recirculator 28 is converted into an electric signal and is supplied to the control circuit 10 as a signal QE.

In the exhaust pipe 76, there is provided a so-called $\lambda$ sensor 80, which detects the mixing ratio of the mixture drawn in the combustion chamber 34. As the $\lambda$ sensors, an $O_2$ sensor (oxygen sensor) is ordinarily used, and it detects the oxygen concentration in the exhaust gas and generates a voltage $V_\lambda$ responsive to the oxygen concentration. The output $V_\lambda$ of the $\lambda$ sensor 80 is supplied to the control circuit 10. The catalytic converter 82 is provided with an exhaust gas temperature sensor 84, the output signal TE of which corresponding to the exhaust gas temperature is supplied to the control circuit 10.

The control circuit 10 is coupled via a negative terminal 88 to earth and a positive terminal 90 to a power source. Further, a signal IGN for controlling the sparking of the foregoing ignition plug 36 is applied to the primary coil of an ignition coil 40 from the control circuit 10, and a high voltage generated in the secondary coil thereof is applied to the ignition plug 36 through a distributor 38, so that sparks for combustion are generated within the combustion chamber 34. More concretely, the ignition coil 40 is coupled via a positive terminal 92 to the power source and the control circuit 10 is provided with a power transistor for controlling the primary coil current of the ignition coil 40. A series circuit consisting of the primary coil of the ignition coil 40 and the power transistor is formed between the positive power source terminal 92 of the ignition coil 40 and the negative power source terminal 88 of the control circuit 10. By rendering the power transistor conductive, electromagnetic energy is stored in the ignition coil 40, and by rendering the power transistor nonconductive, the electromagnetic energy is applied to the ignition plug 36 as energy having a high voltage.

The engine 30 is provided with a water temperature sensor 96, which detects the temperature of engine coolant 94 and a signal TW thus detected is applied to the control circuit 10. Further, the engine 30 is provided with an angle sensor 98 for detecting the rotational position of the engine. By means of the sensor 98, a reference signal PR is generated every 120°, for example, in synchronism with the rotation of the engine, and an angle signal PC is generated each time the engine is rotated by a predetermined angle (e.g. 0.5°). These signals PR and PC are supplied to the control circuit 10.

In the system of FIG. 1, a negative pressure sensor may be used instead of the air flow meter 14. A component 100 indicated by dotted lines in the Figure is the negative pressure sensor, from which a voltage VD corresponding to the negative pressure of the intake manifold 26 is produced and supplied to the control circuit 10.

As the negative pressure sensor, a semiconductor negative pressure sensor may be used in which the boost pressure of the intake manifold is caused to act on one side of a silicon chip, while the atmospheric pressure or a fixed pressure is caused to act on the other side. A vacuum may be used in some cases. With such a structure, the voltage VD corresponding to the manifold pressure is generated by the action of the piezo-resistive effect or the like and is applied to the control circuit 10.

Figure 2:
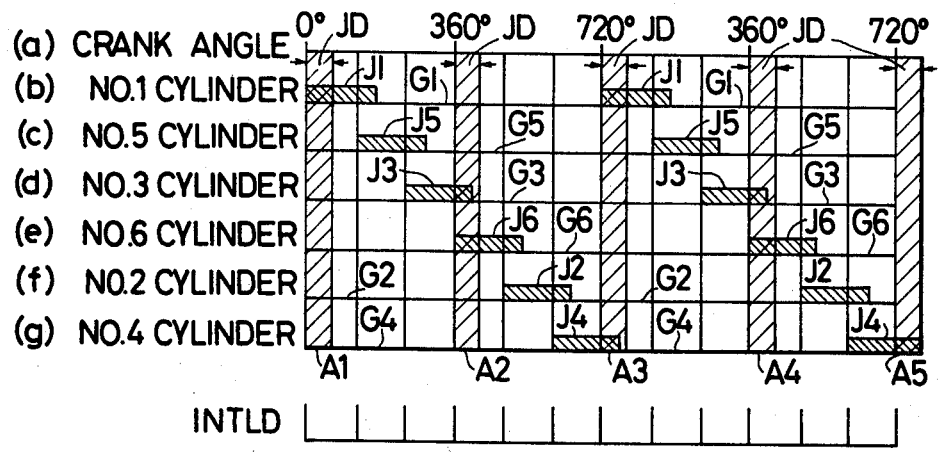
FIG. 2 shows timings of fuel injection and ignition with respect to crank angle.

FIG. 2 is an operational diagram for explaining the ignition timing and the fuel injection timing of a six-cylinder engine varsus the crank angle. In the Figure, (a) represents the crank angle. The reference signal PR is provided from the angle sensor 98 every 120° of the crank angle. That is, the reference signal PR is applied to the control circuit 10 every 0°, 120°, 240°, 360°, 480°, 600°, or 720° of the crank angle.

In FIG. 2, (b), (c), (d), (e), (f), and (g) illustrate the operation of the first cylinder, the fifth cylinder, the third cylinder, the sixth cylinder, the second cylinder, and the fourth cylinder, respectively. J1 through J6 represent the valve opening positions of the suction valves of the respective cylinders. As shown in FIG. 2, the valve opening positions of the respective cylinders are shifted by 120° in terms of the crank angle. Although the valve opening positions and the valve opening widths differ to some extent in dependence on each engine structure, they are substantially the same as indicated in the Figure.

Reference symbols A1 through A5 in the Figure indicate the valve opening timings or fuel injection timings of the fuel injector 66. The time width JD of each of the injection timings A1 through A5 represents the valve opening time of the fuel injector 66. The time width JD can be considered as representing the quantity of fuel injected from the fuel injector 66. The fuel injectors 66 are disposed in correspondence with the respective cylinders, and they are connected in parallel with a driver circuit within the control circuit 10. Accordingly, the fuel injectors corresponding to the respective cylinders open the valves and inject fuel at each occurrence of the signal INJ from the control circuit 10. Operation will be explained with reference to the first cylinder illustrated in FIG. 2. In synchronism with the reference signal INTLD generated at 120° of the crank angle, (the relationship in timing between PR and INTLD will be explained later) output signal INJ is applied from the control circuit 10 to the fuel injectors 66 which are disposed at the manifolds or suction ports of the respective cylinders. Thus, fuel is injected as shown at A2 for the period of time JD calculated by the control circuit 10. Since, however, the first cylinder has its suction valve closed, the injection fuel is held near the suction port of the first cylinder and is not drawn into the cylinder. In response to the reference signal INTLD arising at the point 720° of the crank angle, the signal is sent from the control circuit to the fuel injectors 66 again, and the fuel injection shown at A3 is carried out. At substantially the same time as the injection, the suction valve of the first cylinder is opened. Upon this valve opening, both the fuel injected at A2 and the fuel injected at A3 are drawn into the combustion chamber. The same applies to the other cylinders. That is, in the fifth cylinder illustrated in (c), fuel quantities injected at A2 and A3 are sucked in at the valve opening position J5 of the suction valve. In the third cylinder illustrated in (d), part of the fuel injected at A2, the fuel injected at A3 and part of the injected fuel at A4 are drawn in at the valve opening position J3 of the suction valve. When the part of the fuel injected at A2 and the part of the fuel injected at A4 are put together, they become the quantity of injection corresponding to one injecting operation. Also, in each suction stroke of the third cylinder, a quantity of injection corresponding to two injecting operations is drawn in. Likewise, in the sixth cylinder, second cylinder, or fourth cylinder illustrated a (e) (f), or (g), respectively, the quantity of injection corresponding to two injecting operations of the fuel injector is drawn in by one suction stroke. As understood from the above explanation, the quantity of fuel injection assigned by the fuel injection signal INJ from the control circuit 10 is half the necessary fuel amount to be drawn in, and the necessary fuel amount corresponding to the air drawn into the combustion chamber 34 is obtained by two injecting operations of the fuel injector 66.

In FIG. 2, reference symbols G1 through G6 indicate ignition timings corresponding to the first cylinder through the sixth cylinder respectively. By rendering the power transistor disposed within the control circuit 10 nonconductive, the primary coil current of the ignition coil 40 is cut-off to generate the high voltage in the secondary coil. The generation of the high voltage is effected at the ignition timings G1, G5, G3, G6, G2, and G4, and power is distributed by the distributor 38 to the ignition plugs 36 disposed in the respective cylinders. Thus, the ignition plugs ignite in the order of the first cylinder, fifth cylinder, third cylinder, sixth cylinder, second cylinder, and fourth cylinder, and the mixture consisting of the fuel and the air burns.

CONTROL UNIT (10)

Figure 3:
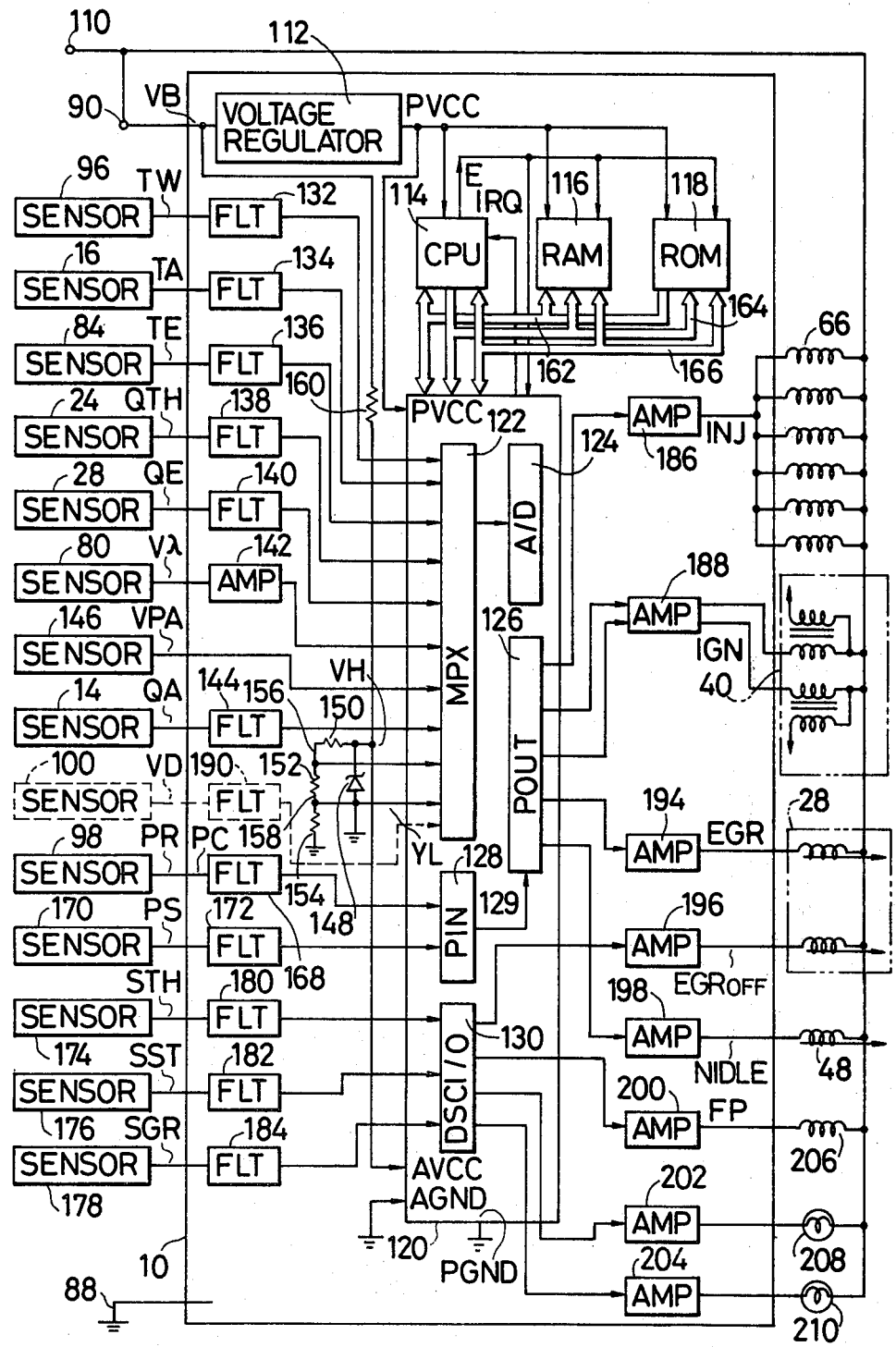
FIG. 3 is a block diagram showing a control unit of the engine control system shown in FIG. 1.

A detailed circuit arrangement of the control circuit 10 in FIG. 1 is shown in FIG. 3. The positive power source terminal 90 of the control circuit 10 is connected to a plus terminal 110 of a battery and a voltage VB is supplied to the control circuit 10. The supply voltage VB is held constant at a fixed voltage PVCC, e.g. 5 V, by a voltage regulator circuit 112. The fixed voltage PVCC is supplied to a central processor 114 (hereinbelow abbreviated as CPU), a random access memory 116 (hereinbelow abbreviated as RAM), and a read only memory 118 (hereinbelow abbreviated as ROM). Further, the output PVCC of the voltage regulator circuit 112 is applied to an input/output circuit 120.

The input/output circuit 120 has a multiplexer 122, an analog/digital converter 124, a pulse output circuit 126, a pulse input circuit 128, and a discrete input/output circuit 130.

Analog signals are applied to the multiplexer 233 from the various sensors. One of the input signals is selected on the basis of a command from the CPU, and is coupled via multiplexer 122 to analog-to-digital converter 124. The analog input signals include the analog signal TW representative of the temperature of the cooling water of the engine, the analog signal TA representative of the suction temperature, the analog signal TE representative of the exhaust gas temperature, the analog signal QTH representative of the throttle opening, the analog signal QE representative of the valve opening state of the exhaust gas recirculator, the analog signal $V_\lambda$ representative of the excess air ratio of the sucked mixture and the analog signal QA representative of the quantity of sucked air, the signals being derived from the sensors shown in FIG., 1, i.e. the water temperature sensor 96, the suction temperature sensor 16, the exhaust temperature sensor 84, the throttle position detector 24, the exhaust gas recirculator 28, the sensor 80 and the air-flow meter 14, through filter 132 through 144. Among them, the output $V\lambda$ of the $\lambda$ sensor 80 is applied to the multiplexer through the amplifier 142 which includes a filter circuit.

In addition, an analog signal VPA representative of the atmospheric pressure is applied from an atmospheric pressure sensor 146 to the multiplexer 122. The voltage VB is supplied from the positive power source terminal 90 through a resistor 160 to a series circuit consisting of resistors 150, 152, and 154. Further, the terminal voltage of the series circuit composed of the resistors is kept constant by a zener diode 148. The values of voltages VH and VL at respective junctures 156 and 158 between the resistors 150 and 152 and the resistors 152 and 154 are applied to the multiplexer 122.

The CPU 114, RAM 116, ROM 118, and the input-/output circuit 120 are respectively coupled to a data bus 162, an address bus 164, and a control bus 166. Further, an enabling signal E is applied from the CPU 114 to the RAM 116, the ROM 118, and the input/output circuit 120. In synchronism with the enabling signal E, the transmission of data through the data bus 162 is effected.

Signals representative of water temperature TW, suction air temperature TA, exhaust gas temperature TE, throttle opening QTH, quantity of exhaust gas recirculation QE, $\lambda$ sensor output $V\lambda$, atmospheric pressure VPA, quantity of suction air QA, reference voltages VH and VL, and negative pressure VD in place of the quantity of suction air QA are respectively supplied to multiplexer 122 of the input/output circuit 120. On the basis of an instruction program stored in the ROM 118, the CPU 114 assigns the addresses of these inputs through the address bus, and the analog inputs of the assigned addresses are stored. The analog inputs are sent from the multiplexer 122 to the analog-to-digital converter 124. The digital values are stored in registers corresponding to the respective inputs, and they are loaded into the CPU 114 or RAM 116 on the basis of instructions from the CPU 114 fed through the control bus 166, as may be needed.

The reference pulses PR and the angle signal PC are applied to the pulse input circuit 128 through a filter 168 from the angle sensor 98 in the form of pulse trains. Further, from a vehicular velocity sensor 170, pulses PS at a frequency corresponding to a vehicular velocity are applied to the pulse input circuit 128 through a filter 172 in the form of a pulse train.

Signals processed by the CPU 114 are held in the pulse output circuit 126. An output from the pulse output circuit 126 is applied to a power amplifier circuit 186, and the fuel injectors are controlled on the basis of the signal.

Shown at 188, 194, and 198 are power amplifier circuits, which respectively control the primary coil current of the ignition coil 40, the degree of opening of the exhaust gas recirculator 28, and the degree of opening of the air regulator 48 in response to the output pulses from the pulse output circuit 126. The discrete input-/output circuit 130 receives and holds signals from a switch 174 for detecting that the throttle valve 20 is in the fully closed state, a starter switch 176 and a gear switch 178 indicating that the transmission gear is a top gear, through filters 180, 182, and 184 respectively. Further, it stores the processed signals from the CPU 114. The signals with which the discrete input/output circuit 130 is concerned are signals each of which can have its content indicated by one bit. Subsequently, signals are sent from the discrete input/output circuit to power amplifier circuits 196, 200, 202, and 204 in response to the signals from the CPU 114. The amplified signals are used to close the exhaust gas recirculator 28 to stop the recirculation of the exhaust gas, control the fuel pump, indicate an abnormal temperature of the catalyst and indicate the overheat of the engine, respectively.

PULSE OUTPUT CIRCUIT (126)

Figure 4:
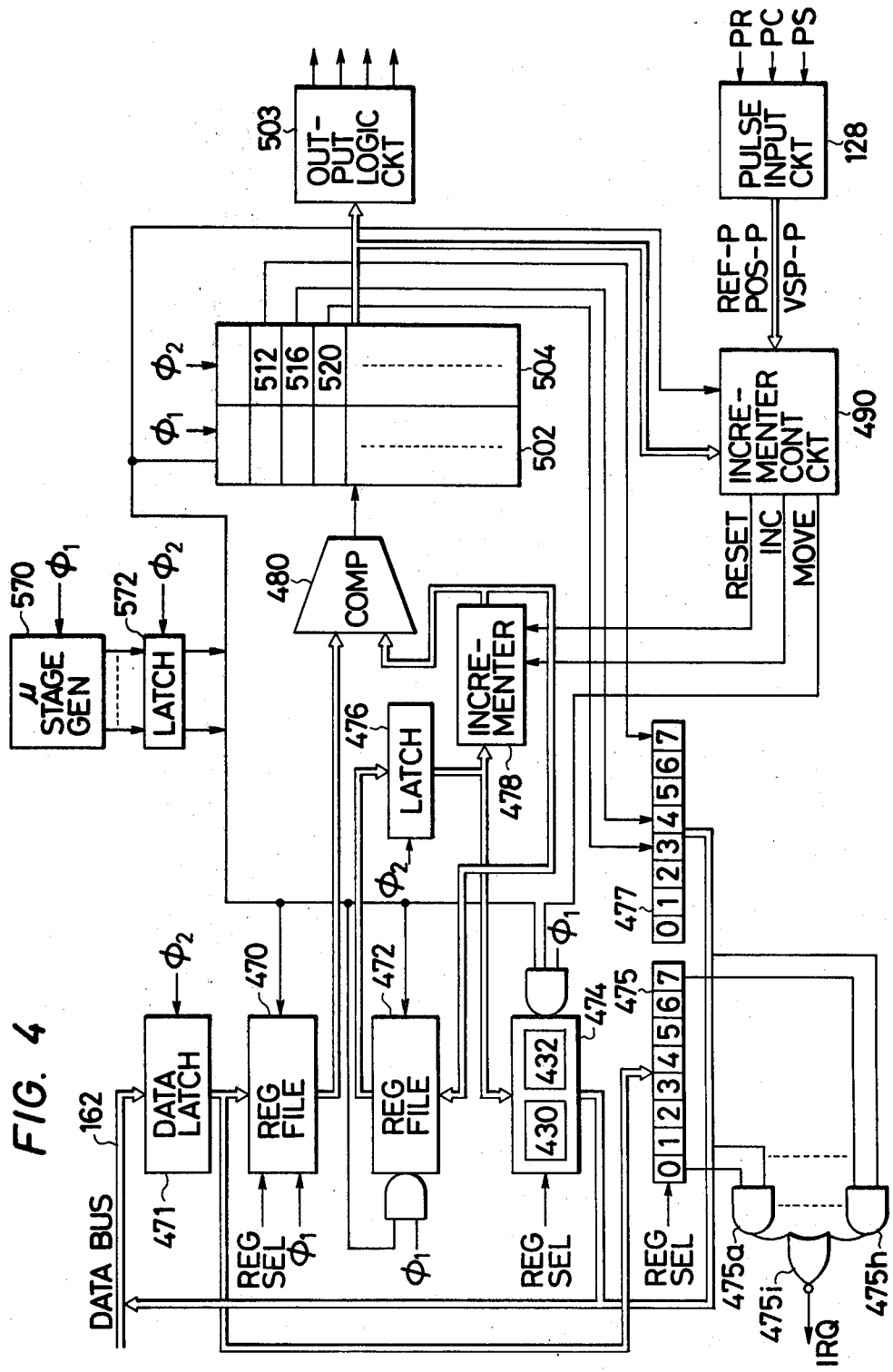
FIG. 4 is a block diagram showing a pulse output unit of the control unit shown in FIG. 3.

FIG. 4 shows a concrete configuration of the pulse output circuit 126. A first register file 470 includes a group of reference registers which hold the data processed by the CPU 114 or hold data indicative of predetermined values. The data is transmitted through the data bus 162 from the CPU 114. The assignment of the registers to hold the data is effected through the address bus 164, and the data is applied to the assigned resisters and held therein.

A second register file 472 includes a group of registers which hold the signals indicative of the engine condition at an instant in time. The second resister file 472, a latch circuit 476, and an incrementer 478 effect a so-called counter function as explained later.

A third resister file 474 includes, for example, a resister 430 for holding the rotational speed of the engine and a register 432 for holding the vehicular speed. These values are obtained in such a way that when certain conditions are fulfilled, the values of the second register file are loaded. A relevant register is selected by a signal sent through the address bus from the CPU and the data held in the third register file 474 is sent to the CPU 114 through the data bus 162 from this register.

A comparator 480 receives reference data from a register selected from the first register file and instantaneous data from a register selected from the second register file and executes a comparsion operation. The comparison result is delivered to and stored in a predetermined register selected from first register group 502 which function as comparison result holding circuits. Further, it is thereafter stored in a predetermined resister selected from a second register group 504.

The read and write operations of the first, second, and third resister files 470, 472, and 474 and the operations of the incrementer 478 and the comparator 480, and the operations of setting outputs into the first and second register group 502, 504 are conducted during prescribed periods of time. Various processes are carried out in a time division manner in conformity with the stage sequence of a stage counter 570. At each stage, predetermined registers among the first and second register files and the first and second register groups and, if necessary, a predetermined register among the third register file 474 are selected. The incrementer 478 and the comparator 480 are used in common.

Description will be hereinafter given of each of the units making up pulse output unit 126.

STAGE PULSE GENERATOR (570)

Figure 7:
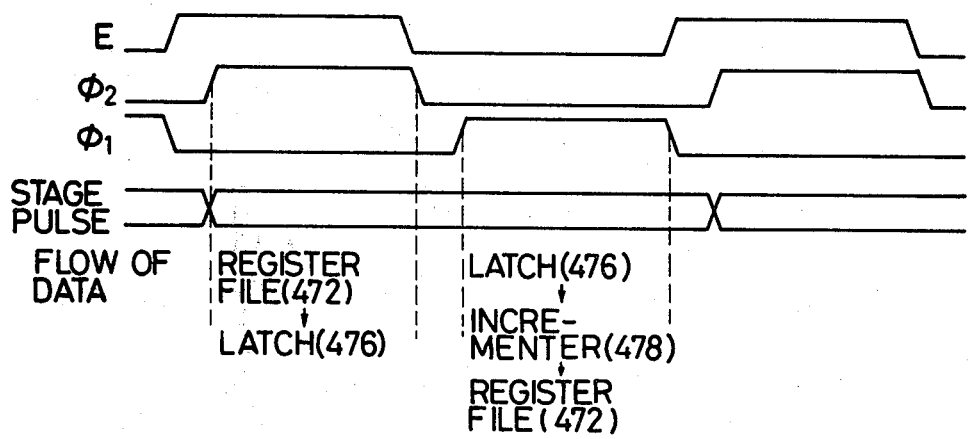
FIG. 7 shows waveforms of clock pulses and stage pulses.
Figure 9:
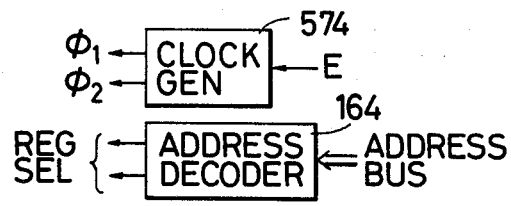
FIG. 9 is a block diagram showing a clock generator and an address decoder.
Figure 5:
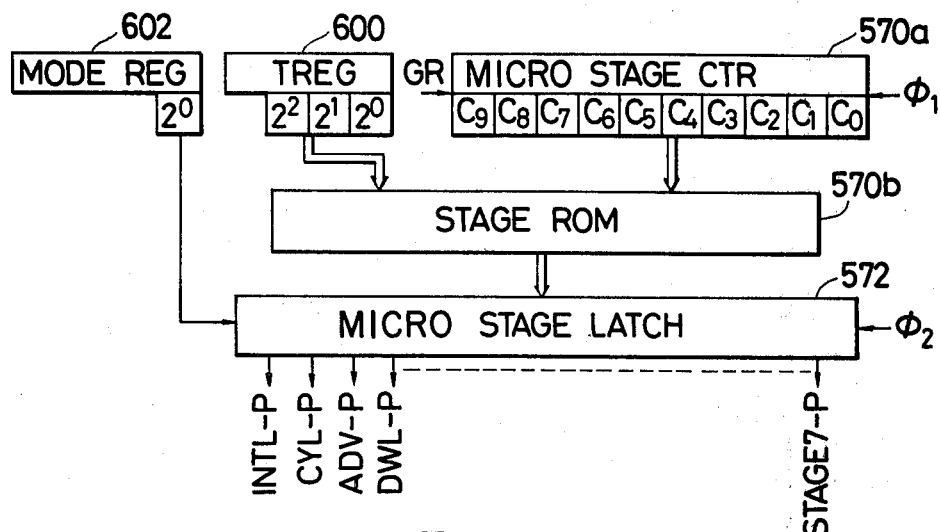
FIG. 5 shows schematic diagram of a microstage pulse generator of the input/output unit.

In FIG. 5, the stage pulse generator 570 incudes a clock pulse generator 574 (FIG. 9) a microstage counter 570a (FIG. 5), a stage ROM 570b (read only memory), and a microstage latch circuit 572. When an enabling signal E is applied to a clock generator 574 as shown in FIG. 9, clock generator 574 produces clock pulses $\emptyset_1$ and $\emptyset_2$ as shown in FIG. 7. The pulses $\emptyset_1$ and $\emptyset_2$ are different in phase and do not overlap. As can be seen in FIG. 5, the clock pulse $\emptyset_1$ is applied to the micro stage counter 570a. The microstage counter 570a is a ten bit counter, for example, and operates to count the clock pulses $\emptyset_1$ applied thereto. The counted value of the microstage counter 570a is applied together with an output from a register 600 (hereinafter referred to as T register) to the stage ROM 570b. ROM 570b is designed to produce stage pulses INTL-P~STAGE 7-P in accordance with the contents of the microstage counter 570a and T register 600.

FIG. 6 shows the relationship between various kinds of stage pulses and the contents of the counter 570a and T register 600. In this table of FIG. 6, symbol X denotes that any one of "1" and "0" can be taken for the purpose of producing a stage pulse as far as the bit X is concerned. By way of example, when the lowest three bits C2, C1, and C0 of the microstage counter 570a are "0", "0", and "1", respectively, a stage pulse INTL-P is delivered. The set value of the T register 600 functions to determine intervals between stage pulses INJ-P, as can be seen in the table. A thus produced stage pulse is shifted to the microstage latch circuit 572 in synchronism with the clock pulse $\emptyset_2$. The stage pulse is delivered from the latch circuit 572 when the lowest bit 2° of a mode register 602 is of the logical "1". The lowest bit 2° of the mode register 602 is set with the logical "1" when CPU 114 produces GO signal and is set with the logical "0" when CPU 114 outputs Non-GO signal. When the lowest bit 2° of the mode register 602 is of the logical "0", the stage latch circuit 572 delivers no stage pulse except for the predetermined stage pulses STAGE 0-P and STAGE7-P. In other words, only the stage pulses STAGE 0-P and STAGE 7-P are permitted to appear without regard to the set value of the mode register 602. The stage pulse is preferably designed to have a pulse width of 1 μsec. All the elementary operations such as ignition control, fuel injection control, and detection of the engine stop are performed with the aid of the stage pulse.

RESISTER FILE (470, 472)

Figure 8A:
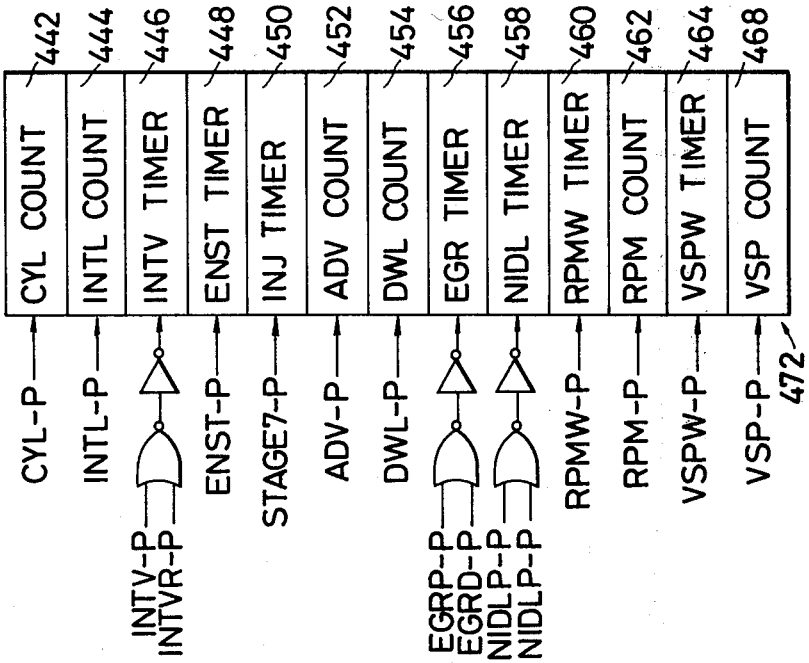
FIGS. 8A and 8B are schematic diagrams showing first and second register files of the input/output units.

In FIG. 4, data sent from the CPU 114 is applied through the data bus 162 to a latch circuit 471 and stored at the timing of the clock pulse $\emptyset_2$. Then the data is applied to a first register file 472 and is stored at the timing of the clock pulse $\emptyset_1$ in the register selected by the register select signal REG SEL supplied from the CPU 114. The register file 470 includes a plurality of registers 404, 406, ... 428 as shown in FIG. 8A. These registers are designed to deliver the stored data by the application of the corresponding stage pulse thereto. By way of example, where the stage pulse CYL-P occurs at the output of the stage pulse latch circuit 572, the resister 404 is selected to deliver its set data CYL REG as an output.

Figure 8B:
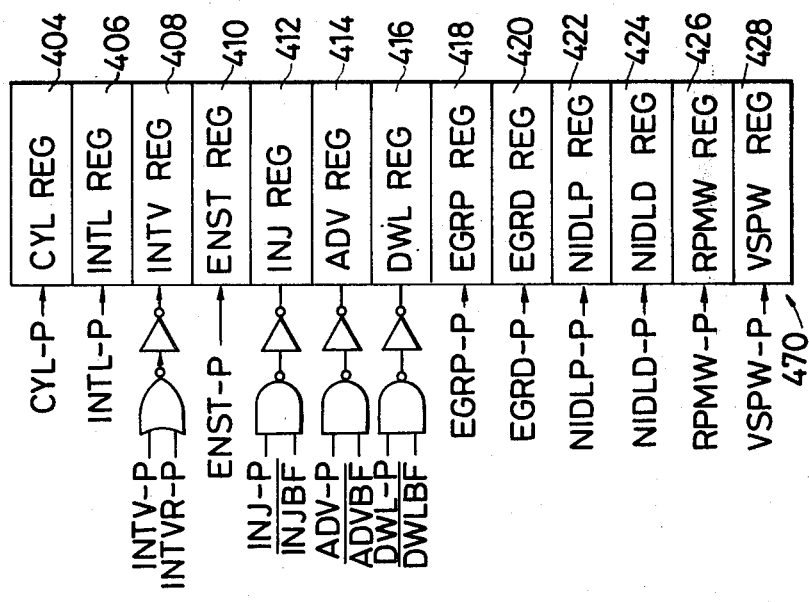

On the other hand, a second register file 472 includes a plurality of counters and timers 442, 444, ... 468 as shown in FIG. 8B, each of which counts up pulses indicative of engine operating condition as of the instant in time during engine operation. In the same manner as described in connection with the first register file, one counter (timer) is selected to deliver its count value when the corresponding stage pulse is applied thereto. Thus, the selected one of registers of the first register file 470 and the selected one of counters or timers of the second register file 472 deliver respective set data which are applied to a comparator 480 and are compared with each other. The comparator 480 produces an output when the count value of the counter or timer becomes equal to or greater than the set value of the register. As will be appreciated from FIGS. 8A and 8B, when the stage pulse CYL-P appears for example, the contents of the register 404 and the counter 442 are compared with each other. Respective registers, counters, and timers are designed to have functions as explained below.

A register 404 stores data CYL REG indicative of a constant value determined in terms of the number of cylinders. On the other hand, a counter 442 counts up the reference pulses INTLD. By the comparison of the set value of the register 404 with the count value of the counter 442, a pulse is obtained every one revolution of crank angle. Data INTL REG stored in a register 406 are used to shift the reference pulse PR in phase by the amount of a fixed angle. A counter 444 counts up crank angle pulses PC produced after the reference pulse PR is detected by the angle sensor 98.

A register 408 holds data INTV REG representative of the period of time desired to be measured as the timer. On the other hand, a timer 446 counts up stage pulses INTV-P produced at intervals of a predetermined period of time, e.g. 1024 μsec. after the setting of data INTV REG into the register 408 has been completed. When the data INTV REG are set, there is established e.g. the stage in which an interrupt signal can be delivered after lapse of the prescribed period of time. That is, the count value INTV TIMER of the timer 446 is compared with the set data INTV REG of the register 408 and when INTV TIMER becomes equal to or greater than INTV REG, the above-mentioned stage is established. A register 410 holds the data ENST REG representative of a predetermined period of time to be used for detecting the state in which the engine has stopped unexpectedly. A timer 448 counts up stage pulses ENST-P which occur a certain time, e.g., 1024 μsec after the reference pulse PR has been detected from the angle sensor 98. The count value ENST TIMER of this timer 448 is returned to zero when the next reference pulse PR is detected. When the count value ENST TIMER becomes equal to or greater than the set data ENST REG, it is seen that the reference pulse PR does not appear for more than the predetermined period of time after the occurrence of the previous reference pulse. In another word, this means the engine has possibly stopped. A register 412 holds the data INJ REG representative of the valve opening time of the fuel injection valve 66 as shown in FIG. 3. A timer 450 counts up the stage pulse INJ-P which appears a predetermined period of time after a stage pulse CYL-P has been delivered from the microstage latch circuit 572 (FIG. 5). The period of time mentioned above is one selected from 8 μsec., 16 μsec., 32 μsec., 64 μsec., 128 μsec., and 256 μsec. This selection is performed by the data set into the T register 600 (FIG. 5). As is apparent from FIG. 6, when the three bits of the T register 600 are espressed as "0, 0, 0", the stage pulse INJ-P is delivered at intervals of 8 μsec. When the T register 600 stores three bits of "0, 0, 1", the microstage latch circuit 572 (FIG. 5) delivers the stage pulse INJ-P every 16 μsec. A register 414 is used to store the data ADV REG representative of the timing of ignition.

Figure 15:
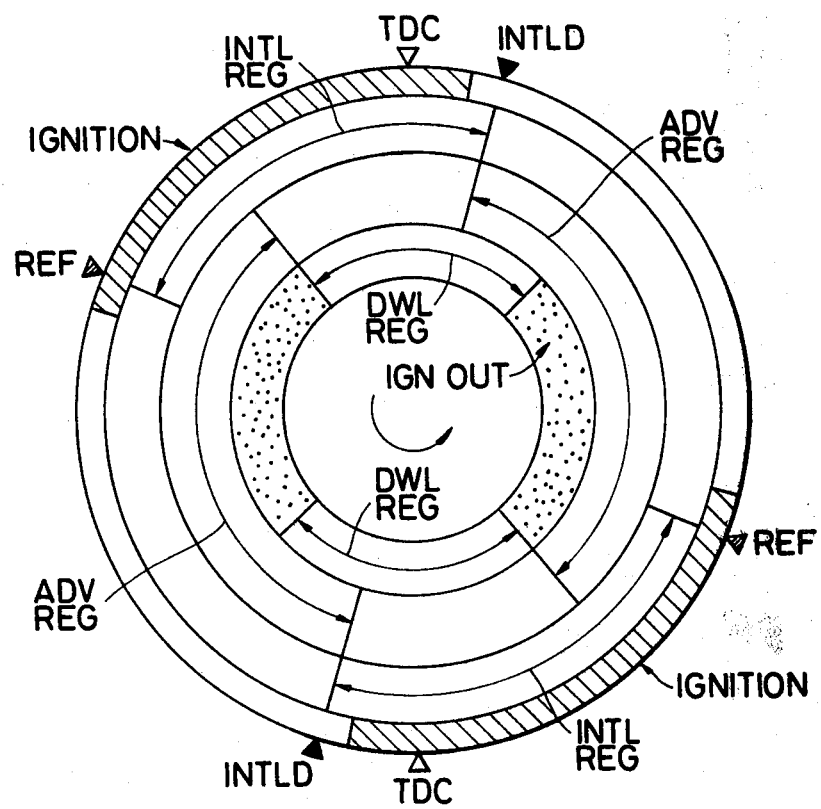
FIG. 15 is a schematic diagram for explaining operation of the engine control system.

That is, the ignition may be performed at the predetermined crank angle indicated by the data ADV REG, after or before the occurrence of the reference pulse INTLD (FIG. 15). A counter 452 counts up the angle pulses PC after the reference pulse INTLD has been delivered. The angle pulses PC are delivered from the angle sensor 98 at each time the engine is rotated by a predetermined amount of crank angles, e.g., 0.5°. A register 416 is provided to set the data DWL REG indicative of the angular period during which the primary coil current of the ignition coil is held in the cut-off state, as can be seen from FIG. 15. A counter 454 counts up pulses generated in synchronism with the crank angle pulses PC after the stage pulse INTL-P has been delivered. A register 418 is provided to store the data EGRP REG representative of the period of the pulsating current signal supplied to the EGR valve 28 (FIG. 3). A register 420 holds the data representative of the pulse width of the pulsating current signal supplied to the EGR valve 28. On the other hand, a timer 456 counts up pulses produced every lapse of a fixed time, e.g. 256 $\mu$sec.

As mentioned above, the quantity of air passing through the bypass 46 of the throttle chamber 18 can be adjusted by means of the air regulator 48. A register 422 holds the data NIDLP REG representative of the period of the pulse applied to the regulator 48 and a register 424 stores the data NIDLD REG indicative of the pulse width. A timer 458 counts up the pulses produced every lapse of a fixed time, e.g., 256 $\mu$sec. The rotational speed of the engine is detected by counting the output pulses of the crank angle sensor 98 for a predetermined period of time. A register 426 is used to store the data RPMW REG representative of the period of time during which the crank angle pulses are counted. On the other hand, a register 426 is provided to hold the data VSPW REG representative of a fixed time to be used for detecting the vehicular speed. A timer 460 counts up the pulses generated every lapse of a fixed time after an output pulse has been delivered from an latch circuit 552 (FIG. 10). A counter 462 is used to count up the pulses produced in a predetermined relationship with the angle pulse PC, after the output pulse has been delivered from the latch circuit 552. Likewise after generation of an output from a latch circuit 556, a timer 464, counts up the pulses generated every lapse of a fixed time while a counter 468 counts up the pulses produced in response to the rotational speed of the wheels.

The data set into each of registers of the first register file 470 are supplied from CPU 114. The pulses to be counted by means of respective timers and counters of the second register file 472 are supplied from an incrementer 478.

Of the data to be set into the first register file 470, those which are to be set into the registers 404, 406, 408, 410, 426 and 428 are constants. The other data which are to be set into the registers 412, 414, 416, 418, 420, 422 and 424 are experimentally obtained in a known manner from sensed signals of various sensors.

INCREMENTER (478)

The incrementer 478 receives control signals INC and RESET from a controller 490 and is designed to produce an output being equal to the set value of the latch circuit 476 puls one when the control signal INC is applied thereto and to produce an output of zero when the control signal RESET is applied thereto. Since the output of the incrementer 478 is applied to the second register file 472, the register of the second register file 472 functions as a timer or counter which counts up one by one in response to the control signal INC. The logic circuit of such incrementer is well known to those skilled in this art and therefore the details thereof will not be described in this specification. The output of the incrementer 478 is applied to the comparator 480 together with the output of the first register file 470. As described previously, the comparator 480 produces an output of the logical "1" when the output of the incrementer 478 becomes equal to or greater than the output of the first register file 470, otherwise it produces an output of the logical "0". The input to the incrementer 478 is set into a third register file 474 in synchronism with the clock pulse $\emptyset_1$ when a control signal MOVE is applied to the register file 474. The set data of the third register file 474 can be transferred through the data bus 162 to the CPU 114.

Precisely stated, the incrementer 478 has three functions as follows. The first is an increment function by which the input data to the incrementer 478 is added by one. The second is a non-increment function by which the input data to the incrementer 478 is passed therethrough without any operation of the addition. The third is a reset function by which the input to the incrementer 478 is changed to zero so that the data indicative of zero is delivered therefrom at all times without regard to its input value.

As mentioned previously, when one of the registers is selected from the second register file 472, the data stored in the selected register is applied through the latch circuit 476 to the incrementer 478 whose output is fed back to the selected register so that the contents of the selected register are refreshed. As a result, where the incrementer 478 offers the increment function by which the input thereof is increased by one, the selected register of the second register file functions as a counter or timer.

In the closed loop including the register file 472, latch circuit 476 and incrementer 478, if such an operating condition occurs that the output of the incrementer 478 begins to be set into the second register file 472 while the contents of the register file 472 are being delivered, the error of the counting operation will be caused at the register file 472. To eliminate such an error, the latch circuit 476 is provided to separate in time between the data flow from the file register 472 to the incrementer 478 and the data flow from the incrementer 478 to the file register 472.

The latch circuit 476 is applied with the clock pulse $\emptyset_2$ and is permitted to receive data from the register file 472 during the period of time that the clock pulse $\emptyset_2$ appears, as shown in FIG. 7. On the other hand, the register file 472 is applied with the clock pulse $\emptyset_1$ and is permitted to receive data from the latch circuit 476 through the incrementer 478 during the period of time that the clock pulse $\emptyset_1$ appears. As a result, there will be no interference between data flows delivered from and applied to the second register file 472.

COMPARATOR (480)
A GROUP OF RESISTERS (502. 504)
OUTPUT LOGIC CIRCUIT (503)

Like the incrementer 478, the comparator 480 operates in no synchronism with the clock pulses $\emptyset_1$ and $\emptyset_2$. Inputs of the comparator 480 are the data delivered from the selected register of the register file 470 and the data delivered from the selected counter or timer through the latch circuit 476 and the incrementer 478. The output signal of the comparator 480 is applied to a first resister group including a plurality of latch circuits and is set to the selected latch circuit in synchronism with the clock pulse $\emptyset_1$. The data thus written into the first register group 502 is then shifted to a second register group 504 in synchronism with the clock pulse $\emptyset_2$. An output logic circuit 503 receives the data set in the second register group 504 to produce output signals for driving the fuel injector, ignition coil, exhaust gas recirculating device and the others. This output circuit 503 includes a logic circuit shown at the reference numeral 710 in FIG. 18, the operation of which will be described later. The first and second register groups 502 and 504 include a plurality of latch circuits 506, 510, . . . 554 and 508, 512, . . . 556, respectively, as shown in FIG. 10.

The data CYL REG of the register 404 (FIG. 8A) are compared with the count value CYL COUNT of the counter 442 by means of the comparator 480. The comparator 480 delivers an output of logical "1" when CYL COUNT becomes equal to or greater than CYL REG and thus resulted output is then set into a latch circuits 506 of the output register group 502. The selection of this latch circuit 506 is performed by way of the stage pulse CYL-P. The set data into the latch circuit 506 is applied to the latch circuit 508 at the timing of clock pulse $\emptyset_2$. The latch circuits of the first output register group 502 are respectively connected to the corresponding latch circuits of the second output register group 504. In a similar way, a signal logical "1" is set into the latch circuit 510 when the condition that INTL REG $\leq$ INTL COUNT is detected. The content of the latch circuit 510 is shifted into the latch circuit 512 at the timing of clock $\emptyset_2$.

Likewise, upon the conditions that
INTV REG $\leq$ INTV TIMER,
ENST REG $\leq$ ENST TIMER,
INJ REG $\leq$ INJ TIMER,
ADV REG $\leq$ ADV COUNTER,
DWL REG $\leq$ DWL COUNTER,
EGRP REG $\leq$ EGR TIMER,
EGRD REG $\leq$ EGR TIMER
NIDLP REG $\leq$ NIDL TIMER,
NIDLD REG $\leq$ NIDL TIMER
RPMW REG $\leq$ RPMW TIMER, and
VSPW REG $\leq$ VSPW TIMER
a signal of logical "1" is respectively set in the latch circuits 514, 518, 522, 526, 530, 534, 538, 542, 546, 550 and 554. Since each of latch circuits of the output register groups 502 and 504 stoes information of either "1" or "0", it may be 1 bit register.

INCREMENTER CONTROL CIRCUIT (490)

Figure 17:
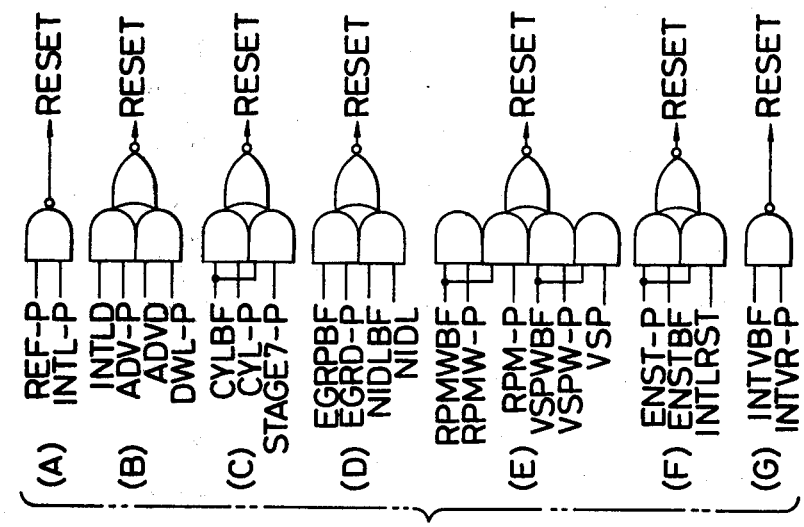
FIG. 17 is a schematic diagram showing a logic circuit for producing a reset signal.
Figure 16:
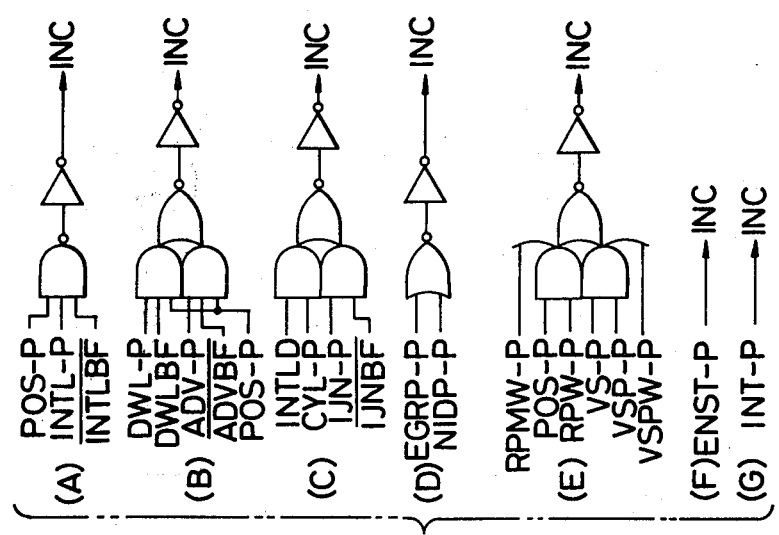
FIG. 16 is a schematic diagram showing a logic circuit for producing an increment control signal.

The incrementer control circuit 490 includes logic circuits shown in FIGS. 16 and 17 and produces control signals INC, RESET, MOVE for the control of the incrementer 478. The operation and details of the incrementer control circuit 490 will be described later.

The status register 477 having a 0th bit through a 7th bit is provided to indicate whether or not there are interrupt requests. One of the interrupt requests is delivered from the latch circuit 512 in synchronized relationship with a rotation of the engine. The interrupt request signal delivered from the latch circuit 512 is set into the 7th bit of the status register 477 and is used to determine the timing of setting the data indicative of the injection time into the register 412 from the CPU 114.

Another interrupt request is delivered from the latch circuit 516 every lapse of a predetermined period of time, e.g. 1024 $\mu$sec. This interrupt request signal delivered from the latch circuit 516 is set into the 4th bit of the status register and is used to give the timing for starting the calculation of the data indicative of the period of time for the fuel injection.

A further interrupt request signal is delivered from the latch circuit 520 when an unexpected engine stop condition is detected, and is set into the 3rd bit of the status register 477. Although other interrupt requests will be produced depending upon various conditions of the engine, they are not closely related to the subject matter of the present invention, and the explanation thereof is omitted accordingly.

The mask register 475 has the same number of bits as the status register and is adapted to receive data sent through the data bus from the CPU 114. Depending upon the data received, the mask register 475 functions to control the inhibition or admission of sending the interrupt request signal stored in the status register 477 to the CPU 114. For this purpose, AND logic circuits 475a, . . . 475h are provided each of which is connected to both the registers 475 and 477 to receive a signal of one bit corresponding to each other from the respective registers. All the outputs of the AND logic circuit 475a, 475h are applied to a NOR logic circuit 475i whose output IRQ is applied to the CPU 114.

When the mask register 475 has a logical "1" at all its bits, the signal IRQ indicating whether or not any one of the interrupt requests has been occurring passes through the gate circuits 475a, . . . , 475i and is applied to the CPU 114. The the CPU 114 receives all the contents of the status register 477 through the data bus 162 to check which interrupt is being requested.

INPUT SIGNAL SYNCHRONIZER CIRCUIT (128)

This circuit 128 receives sensed pulses indicative of, for example, the rotational speed of the engine and a vehicular speed and produces an output pulse synchronized with the clock pulse $\emptyset_1$ or $\emptyset_2$. The pulses sensed and applied to the synchronizer circuit 128 are a reference signal PR which is generated every revolution of the engine, an angle signal PC produced each time the engine rotates a predetermined angle and a pulse PS indicative of the vehicle running speed. The intervals of these pulses change greatly depending on, for example, the vehicular speed and are not synchronized with the clock pulses $\emptyset_1$ and $\emptyset_2$. In order to use these pulses PR, PC, and PS for the control of the incrementer 478 the sensed pulses are necessary to be synchronized with the stage pulse. Further, the angle signal PC and the vehicular speed signal PS are to be synchronized at both the rising portions and falling portions with the stage pulse for the improvement of detection accuracy while the reference signal PR may be synchronized at its rising with the stage pulse.

Figure 11:
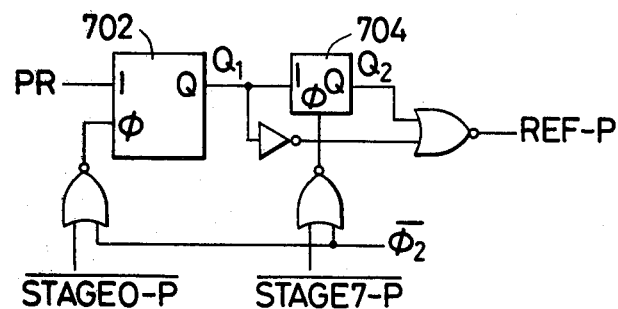
FIG. 11 is a diagram of a logic circuit for producing a reference signal.
Figure 12:
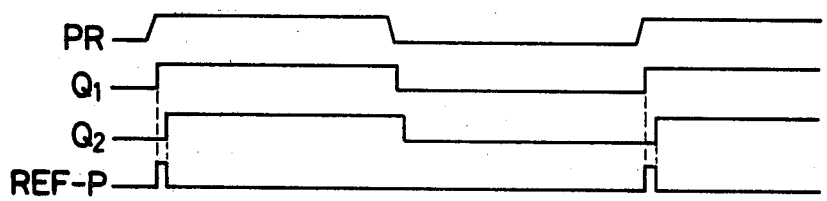
FIG. 12 shows waveforms of signals appearing at respective points of the logic circuit shown in FIG. 11.

In FIG. 11 showing a logic diagram of a synchronizer circuit for the reference signal PR, the sensed signal PR is applied to a terminal I, and the inverted clock pulse $\emptyset_2$ as well as the inverted stage pulse STAGE 0-P are applied through NOR logic circuit to a terminal $\emptyset$ of a latch circuit 702. The latch circuit 702 produces, at a terminal Q, an output pulse shown at $Q_1$ in FIG. 12. Another latch circuit 704 receives at its terminal I the pulse $Q_1$ and at its terminal the inverted clock pulse $\emptyset_2$ together with the inverted stage pulse STAGE 7-P through NOR logic circuit. As a result, the latch circuit 704 produces an output shown at Q2 in FIG. 12. A synchronized reference pulse REF-P is produced from the output Q2 and the inverted output $Q_1$ as shown at REF-P in FIG. 12.

Figure 13:
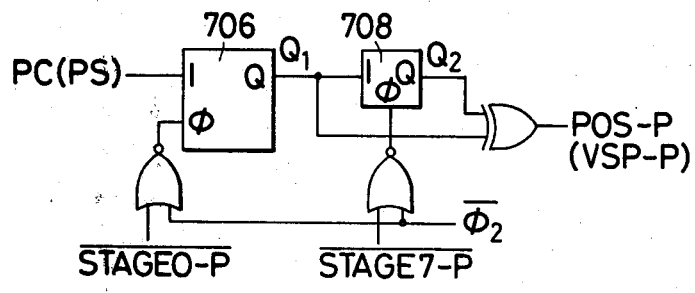
FIG. 13 is a diagram of a logic circuit for producing an angle signal.
Figure 14:
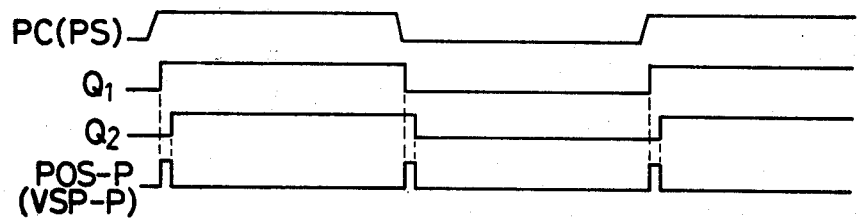
FIG. 14 shows waveforms of signals appearing at respective points of the logic circuit shown in FIG. 13.

In FIG. 13 showing a synchronizer circuit for the angle signal PC and the vehicular speed signal PS, the sensed signal PC (or PS) shown in FIG. 14 is applied to a terminal I while the inverted clock pulse $\emptyset_2$ and the inverted stage pulse STAGE 0-P are applied though NOR logic circuit to a terminal $\emptyset$ of a latch circuit 706. Obtained from a terminal Q of the latch circuit 706 is signal $Q_1$ shown in FIG. 14, which is applied to a terminal I of a latch circuit 708. The output $Q_1$ and $Q_2$ of the latch circuits 706 and 708 are applied to an exclusive OR logic circuit to generate a synchronized signal POS-P (or VSP-P).

OPERATION

(1) Producing a Reference Pulse INTLD

Figure 18:
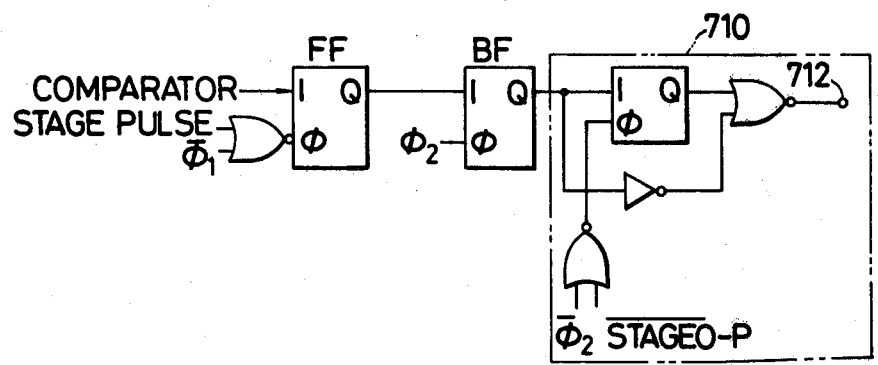
FIG. 18 shows a diagram of an output logic circuit.
Figure 19:
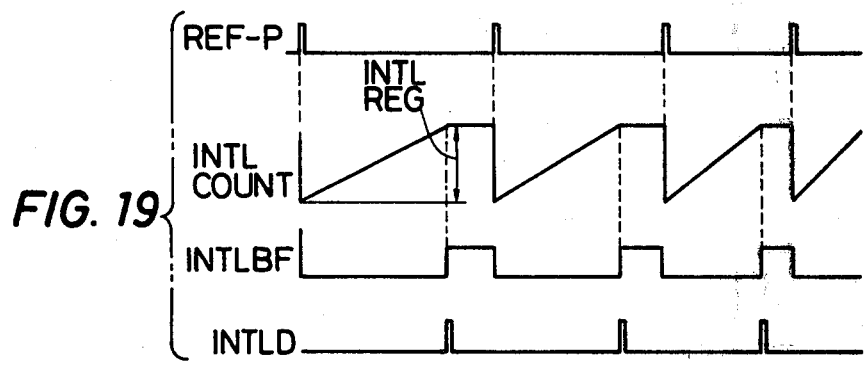
FIGS. 19, 20, 21, 25, 26 and 27 shows waveforms for explanation of the operation of the engine control apparatus.

For the controls of ignition timing, fuel injection and the detection of the engine stop, it is necessary to produce the reference pulse INTLD which is delayed by the angle corresponding to the value INTL REG set in the register 406 from the pusle REF-P obtained by means of a crank angle sensor, as shown in FIG. 15. This pulse INTLD serves to set the reference point for the controls such as the ignition timing. The reference point is set at the position spaced by a predetermined angle from the top dead center of the engine, so that the ignition can take place at the predetermined timing irrespective of the mounting position of the crank angle sensor. When the stage pulse generator 570 produces the stage pulse INTL-P, the register 406 of the first register file 470 and the counter 444 of the second register file 472 are selected for the operation of comparision, as seen from FIGS. 8A and 8B. At the same time, the incrementer controller 490 produces the increment control signal INC by means of the logic circuit shown in FIG. 16(A) and the reset signal RESET by means of the logic circuit shown in FIG. 17(A). Both the increment control signal INC and the reset signal RESET are applied to the incrementer 478. The counter 444 counts up the stage pulse POS-P so that the resulted count value increases gradually as shown at INTL COUNT in FIG. 19. When the count value INTL COUNT of the counter 444 becomes equal to or greater than the set value INTL REG of the register 406, that is, INTL REG≦INTL COUNT, the comparator 480 produces an output which is applied to the latch circuit 510 of the first register group 502, and then to the latch circuit 512 of the second register group 504 as shown in FIG. 10. The logic circuit shown at a reference number 710 in FIG. 18 is connected to the output of the latch circuit 512 so that the reference pulse INTLD shown in FIG. 19 can be obtained at an output terminal 712 of the logic circuit 710. It is noted in FIG. 19 that the pulse INTLBF used for producing INTLD pulse is an output from the latch circuit 512 of FIG. 10.

As can be seen from FIG. 16(A), not only the stage pulses POS-P, INTL-P, but also the inverted output INTLBF of the latch circuit 512 are utilized for producing the increment control signal INC so that the counter 444 will terminate its counting operation when the condition of (INTL COUNT)≧(IINTL REG) is detected by the comparator 480. Reasons for the necessity for the termination of the counting operation are as follows. In the case of a four cylinder engine, the reference pulse REF-P is produced once every 180° of the crank shaft movement. If the crank angle sensor is designed to generate pulses POS-P every 0.5° of angular movement of the crank shaft, the number of pulses POS-P becomes more than 360 between two adjacent reference pulses REF-P. Since the counter 444 is usually designed to have eight bits, the above-mentioned number of the pulses POS-P is great enough to cause overflow in the counter 444, thereby producing another pulse INTLD at the undesired timing. The use of the output pulse INTLBF for producing the increment control signal serves to prevent the producing of such undesired reference pulse.

(2) Ignition Control

In the operation of the ignition control, a control signal IGN out is produced which flows through the ignition coil. For this control, data ADV indicative of the ignition timing and data DWL indicative of the nonconductive period of time of the ignition coil are supplied from the CPU 114 and set into the registers 414 and 416, respectively. FIG. 15 shows the relationship between the set value ADV REG of the register 414 and the set value DWL REG of the register 416. The set value ADV REG serves to define a spark advance indicating the position of the crank shaft at which an ignition spark is to occur after (or before) the piston reaches its top dead center position, while the set value DWL REG indicates the number of crank angles during which the ignition coil is rendered non-conductive.

Figure 20:
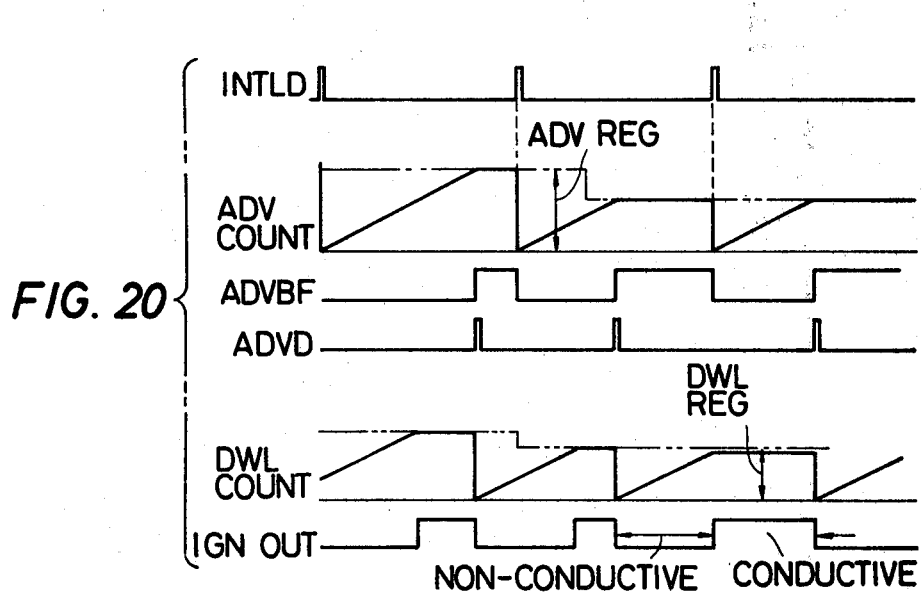

When the stage pulse ADV-P is delivered from the stage pulse generator 570, and applied to the first and second register files 470 and 472, the register 414 and the counter 452 are selected for operation, as shown in FIGS. 8A and 8B. At the same time, the stage pulse ADV-P is applied to the incrementer controller 490 in which an increment control signal INC is produced by a logic circuit shown in FIG. 16(B) and a reset signal RESET is produced by a logic circuit shown in FIG. 17(B). By the application of the increment signal INC to the incrementer 478, the incrementer 478 functions to and "1" with the value set in the latch circuit 476 and delivers the resultant value to the second register file 472, so that the counter 452 of the second register file 472 counts up the synchronized angle pulses POS-P. When the count value ADV COUNT of the counter 452 becomes equal to or greater than the set value ADV REG of the register 414, the comparator 480 produces an output which is applied to a latch circuit 526 of the first register group 502 shown in FIG. 10. An output of the latch circuit 526 is applied to another latch circuit 528 and then to an output logic circuit 710 shown in FIG. 18. The logic circuit 710 functions to produce an output pulse ADVD shown in FIG. 20 from the output ADVBF of the latch circuit 528. This output pulse ADVD is used for producing a reset signal in DWL-P stage (FIG. 17(B)). When the stage pulse DWL-P is delivered from the stage pulse generator 570, the register 416 of the first register file 470 and the counter 454 are selected for operation as can be seen from FIGS. 8A and 8B. In the incrementer controller 490, the increment control signal INC and the reset signal RESET are produced by logic circuits shown in FIGS. 16(B) and 17(B), respectively. As a result, the counter 454 increases its count value in accordance with the pulse POS-P and remains at constant value upon reaching the set value DWL REG of the register 416 and is then reset by the aforementioned pulse ADVD as shown in FIG. 20. The comparator produces an output signal which is rendered on-state during the count value DWL COUNT being equal to the set value DWL REG. As a result, the latch circuit 532 delivers an output pulse shown at IGN out in FIG. 20, which is supplied to the ignition coil.

(3) Fuel Injection Control

In operation of the fuel injection control, the timing of the fuel injection relative to the ignition timing and the others is shown in FIG. 2. As will be appreciated from FIG. 2, the fuel injection takes place once every revolution of the engine at the same time for all the cylinders.

Figure 21:
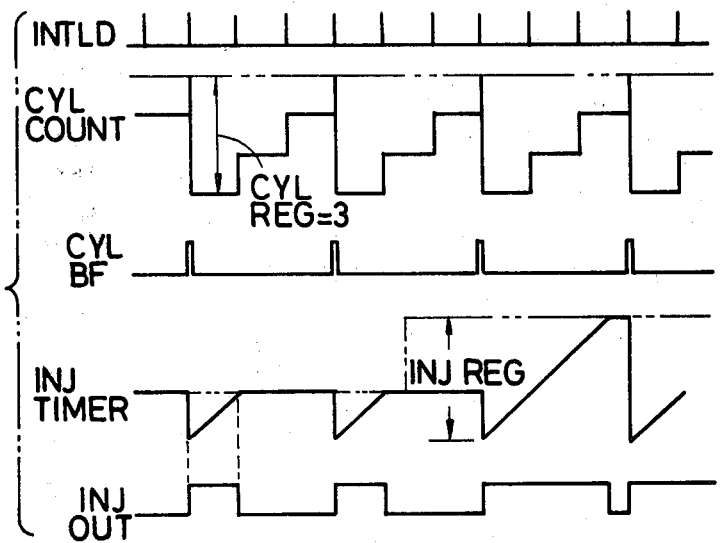

When the stage pulse CYL-P is delivered from the stage pulse generator 570, such pulse serves to select the register 404 of the first register file 470 and the counter 442 of the second register file 472. The register 404 is preliminarily set with a constant value CYL REG which is, for example, equal to 2 in the case of a four cylinder engine, 4 in the case of a six cylinder engine. By the application of the stage pulse CYL-P to the increment control circuit 490, the control circuit 490 produces an increment control signal INC and a reset signal RESET by means of logic circuits shown in FIGS. 16(C) and 17(C), respectively. As a result, the count value CYL COUNT of the counter 444 varies in accordance with the pulse INTLD as shown in FIG. 21 and when the count value CYL COUNT of the counter 444 reaches a value equal to the set constant number CYL REG, the latch circuit 508 produces an output shown at CYLBF in FIG. 21.

Following the above-mentioned stage, when the next stage pulse INJ-P is produced, the register 412 of the first register file 470 and the timer 450 of the second register file 472 are selected for operation of the comparison. At the same time, the incrementer 490 is given an increment control signal INC and a reset signal RESET produced by logic circuits shown in FIGS. 16(C) and 17(C), respectively. With the aid of the incrementer 478, the timer 450 increases its value until the value becomes equal to the set data INJ REG of the register 412 and is reset by the aforementioned pulse CYLBF. The comparator 480 delivers an output signal during the condition of INJ TIMER$\geq$INJ REG being met. Since the output logic circuit 710 shown in FIG. 18 is connected with the latch circuit 524 to which the comparator output is applied through the latch circuit 522, an injection control signal shown at INJ out can be obtained at the output terminal 712 of the output logic circuit 710. The reason why the timer 450 is designed to terminate its counting operation when the count value INJ COUNT becomes equal to the set value INJ REG of the register 412 is to prevent the timer 450 from overflowing in its count value just like the case of the ignition control. The presence of the injection control signal INJ out is set at the bit of $2^\circ$ in the status register 477 in synchronism with the clock pulse $\emptyset_1$ so that the CPU 114 may be informed of the condition of the injection control signal INJ out, if necessary.

The description will now be made of the correction of the amount of fuel injected when the automotive vehicle is accelerated. The present invention is characterized by the fact that the fuel injection is controlled on the basis of the change in the amount of air per unit time which is detected by an air flow meter 14.

Figure 22A:
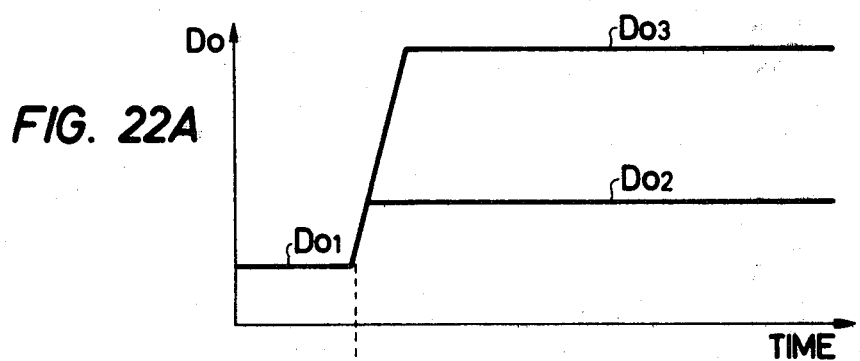
FIGS. 22A, 22B and 22C show the principle of corrective fuel injections according to the embodiments of the present invention.
Figure 22B:
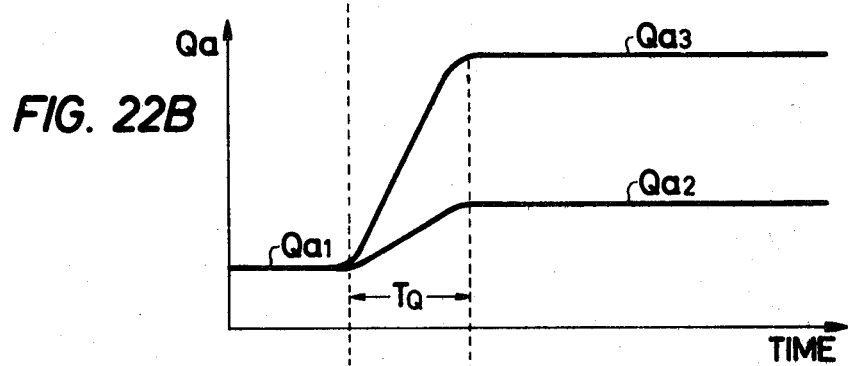

FIGS. 22A and 22B show variations in the opening degree $D_o$ of the throttle valve 20 and the amount of air $Q_a$ drawn into the intake manifold at the time the vehicle is accelerated. As can be seen from these figures, the time constant $T_Q$ of the transient response of the air flow is substantially constant without regard to changes in the opening degree of the throttle valve. This means that as the degree of valve opening movement of the throttle valve is larger, the increase in air flow becomes more abrupt. More specifically, when the opening degree of the throttle valve 20 has changed from $D_{o1}$ to $D_{o2}$ as shown in FIG. 22A or it has changed from $D_{o1}$ to $D_{o3}$, the corresponding air flow changes from $Q_{a1}$ to $Q_{a2}$ as shown in FIG. 22B or from $Q_{a1}$ to $Q_{a3}$, so that the time constant $T_Q$ remains substantially constant. Accordingly the variation of the air flow per unit time $(dQ_a/dt)$ represents the amount of changes in the opening degree of the throttle valve 20, and therefore will represent the degree of the driver's acceleration request.

Figure 22C:
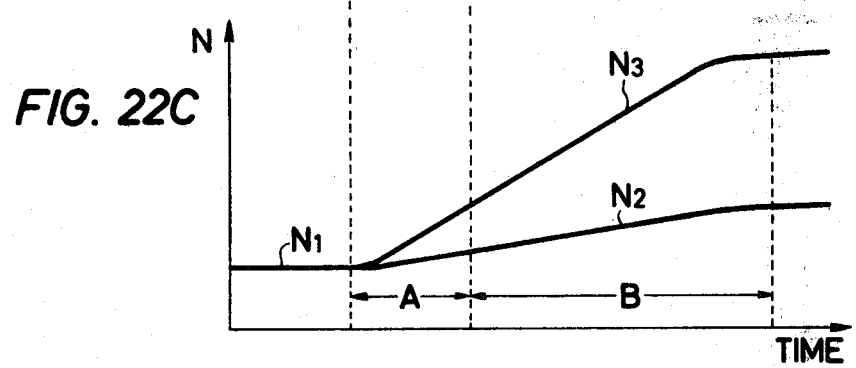

On the other hand, FIG. 22C shows the transient response of the engine revolution number N when the opening degree of the throttle valve has changed. In general, the number N of the engine revolutions has a time constant which is several times greater than that of the air flow. Therefore, even after the air flow has reached a fixed value, the number N of engine revolutions continues to rise.

A corrective fuel injection control based on the variation $(dQ_a/dt)$ executed in a time interval A will achieve a considerable enhancement in the accelerating performance of the engine, but is ineffective in a time interval B. Therefore, according to an embodiment of the present invention, the corrective fuel injection control is carried out in a certain section within the time interval B in order to further improve the accelerating performance of the engine.

The computation of the fuel injection time is executed in synchronism with the revolutions of the engine in some cases, and is executed every fixed time in other cases. Here, an example of the latter will be explained. As mentioned in connection with FIG. 4, the status register 477 is adapted to receive at its 7th bit the output of the latch circuit 512 and at its 4th bit the output of the latch circuit 516. The output of the latch circuit 512 is an INTLD pulse which is produced in synchronized relationship with the rotations of the engine as shown in FIG. 2 and the output of the latch circuit 516 is generated every fixed period of time T. For the sake of brevity, the former is hereinafter referred to as an INTLD interrupt signal and the latter is referred to as a timer interrupt signal. In the present case, the period of time T is assumed to be equal to a period for computing the fuel injection time.

According to an embodiment of the present invention, the setting of the data INJ REG representative of the fuel injection time $t_i$ into the register 412 is performed on the basis of the INTLD interrupt signal while the calculation for the fuel injection time $t_i$ is performed in synchronism with the timer interrupt signal.

Figure 24A:
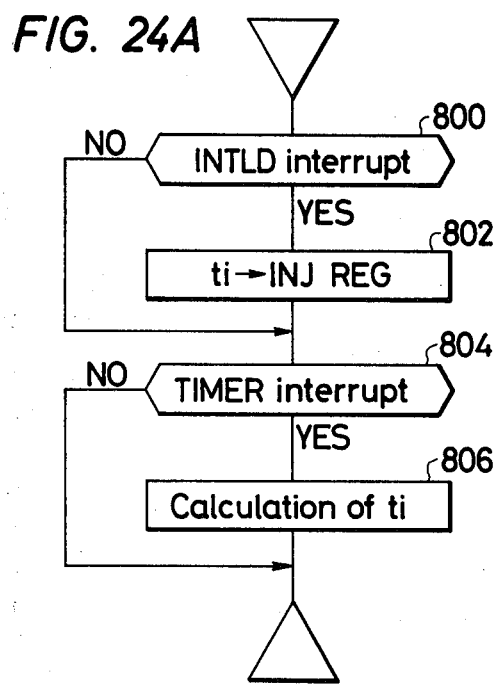
FIGS. 24A, 24B and 24C show flow charts for explanation of the operation of the corrective fuel injection.

FIG. 24A is a flow chart showing the outline of a processing program which is stored in the ROM 118 and activated by the interrupt signal.

When the CPU 114 accepts the interrupt request signal IRQ, the program of FIG. 24A is performed. At a step 800, the contents of the status register 477 are transferred through the data bus 162 to the CPU 114 which judges whether the INTLD interrupt is present. In the presence of the INTL interrupt, the fuel injection time $t_i$ already computed is delivered to the register 412 shown in FIG. 8A at a step 802, and the fuel injection is carried out in the manner mentioned in connection with FIG. 21. At a step 804, the presence or absence of the timer interrupt request is judged from the contents of the status register 477 received at the CPU 114. In the presence of the timer interrupt request, the fuel injection time $t_i$ is computed at a step 806.

Figure 24B:
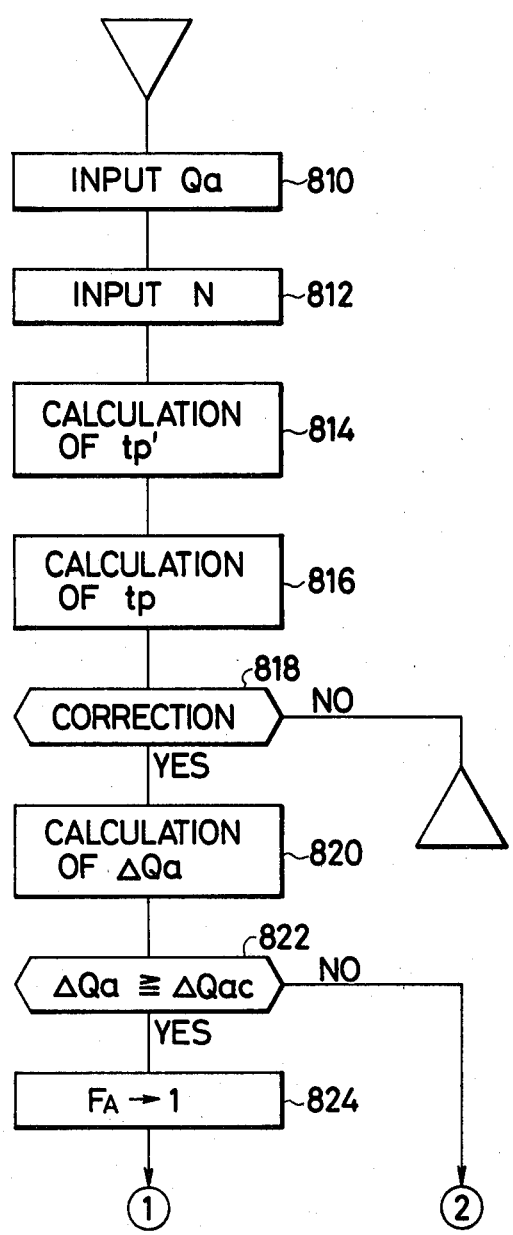

FIG. 24B shows a detailed flow chart of the calculating process of the time $t_i$. At a step 810, the air flow $Q_a$ detected by the air flow sensor 14 shown in FIG. 1 is applied to the CPU 114 through the multiplexer 122 and A/D converter 124. At the next step 812, the number N of engine revolutions (crankshaft rotational speed) is applied to the CPU 114 from the register 430 of the third register file 474. As mentioned before, the counter 426 counts up the angle pulses PC for a predetermined period of time and the count value indicating the engine revolution speed is stored in the register 430. Further, at a step 814, the basic fuel injection time $t_p'$ is calculated from the applied air flow $Q_a$ and the engine revolution number N, by using following equation (1).

$$t_p' = K_1 Q_a / N \tag{1}$$

where $K_1$ indicates a constant.

The value $t_p'$ is made corrective with the factors of the engine coolant temperature $T_w$, the suction temperature $T_a$ etc. in well known manner, at a step 816. The resultant value of the basic fuel injection time is expressed below.

$$t_p = K_1 \cdot K_2 Q_a / N \tag{2}$$

where $K_2$ represents correction factor.

At a step 818, various conditions are checked in order to know if corrective fuel injection control for an acceleration can be performed without any errors. As such conditions to be checked, there are mentioned, for example, that the throttle switch 174 is in the "off" state and the starter switch is in the "off" state. This is because the corrective fuel injection control should not be carried out under these conditions even if the request for the correction may occur. Subsequently, at a step 820, an increment $\Delta Q_a$ of the air flow is calculated as follows:

$$\Delta Q_a = Q_a - Q_a' \tag{3}$$

where $Q_a$ represents the air flow measured at present time and $Q_a'$ applied at the preceding computation. At a step 822, whether or not the increment $\Delta Q_a$ of the air flow is equal to, or greater than, a predetermined value $\Delta Q_{ac}$ is checked to see if the corrective fuel injection is needed. If the increment $\Delta Q_a$ is at least the predetermined value $\Delta Q_{ac}$ the corrective fuel injection control for the acceleration is to be executed. For the preparation of this fuel control, a flag bit $F_A$ provided in the RAM 116 is set with "1" at a step 824. The flag bit $F_A$ is provided to indicate whether the acceleration correction for the time interval A shown in FIG. 22C is to be carried out. At a step 826, the corrective fuel injection time $t_a$ is calculated from the increment $\Delta Q_a$ of the air flow as follows.

$$t_a = K_a \cdot \Delta Q_a \tag{4}$$

where $K_a$ is a constant

The idea of the equation (4) is based on the fact that as the increment $\Delta Q_a$ of the air flow becomes greater, a greater time width of the pulse for the fuel injection control will be needed for the supply of more fuel into the engine.

At a step 828, it is checked if the resultant value $t_a$ is over a predetermined maximum value $t_a$ max which is determined in consideration of the fact that the injection valve should be closed before the opening operation thereof starts for the next revolution of the engine. In other words, as indicated in FIG. 2, the injection valve is to open once a revolution and should not continue to open over 360° of the crank shaft.

If $t_a$ is greater than $t_a$ max, then the fuel injection time $t_i$ is calculated at a step 832 follows:

$$t_i = t_p + t_a \text{ max} \tag{5}$$

On the other hand, $t_a$ is not greater than $t_a$ max, the fuel injection time $t_i$ is calculated at a step 830 as follows:

$$t_i = t_p + t_a \tag{6}$$

As explained before, the data INJ REG representative of the fuel injection time $t_i$ is set into the register 412 and the fuel injection control signal $INJ_{out}$ is produced as indicated in FIG. 21.

Figure 24C:
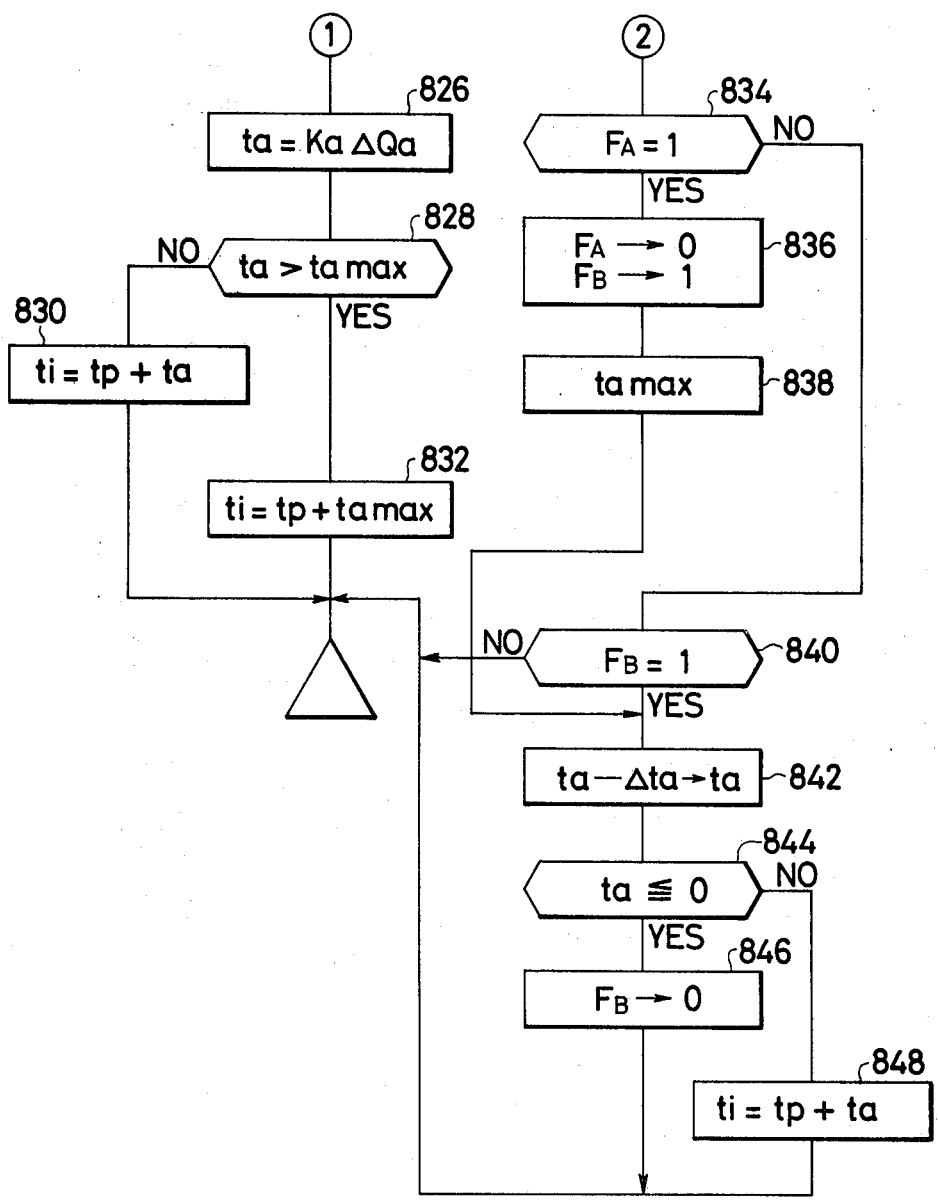

On the other hand, if the increment $\Delta Q_a$ is judged to be less than $\Delta Q_{ac}$, the processing proceeds with a step 834 in FIG. 24C. At this step 834, it is checked if the flag bit $F_A$ is set with a logical "1" or not. Since $\Delta Q_a$ is less than $\Delta Q_{ac}$, the corrective fuel injection for the acceleration for the time interval A is not required at present. However, if such corrective fuel injection for the time interval A was previously made, the corrective fuel injection for the time interval B may be needed even if $\Delta Q_a'$ is less than $\Delta Q_{ac}$ at present. In order to check if the corrective fuel injection for the time interval B is necessary, the judgement of the step 834 is made. When $F_A$ equals to a logical "1", the corrective fuel injection for the time interval B is necessary. At a step 836, in order to initiate the corrective fuel injection for the time interval B, a flag bit $F_B$ is set to a logical "1" and a flag bit $F_A$ is set to a logical "0". The flag bit $F_B$ is provided in the RAM 116 to indicate whether the corrective fuel injection control for the time interval B is to be performed. A logical "1" of the flag bits $F_A$ and $F_B$ represents the execution of the corrective fuel injection and a logical "0" represents the termination of the corrective fuel injection. At a step 838, the initial value for the acceleration correction time for the time interval B is set to $t_a$ max.

If the flag bit $F_A$ is not equal to "1", which means that the corrective fuel injection was not carried out of previous time, the processing proceeds with a step 840. At this step 840, a check is carried out to determine if the corrective fuel injection for the time interval B is under execution. If both the flag bits $F_A$ and $F_B$ are "0", then no corrective fuel injection is required, so that the normal fuel injection control is performed.

On the other hand, if the flag bit $F_B$ is a logical "1", a value obtained by subtracting a fixed value $t_a$ from the preceding correction time $t_a$ is made the present correction time. At a step 844, it is judged whether or not the obtained value $t_a$ is equal to, or less than zero. When $t_a \leq 0$ has been established, the flag bit $F_B$ is made a logical "0" at a step 846 and the corrective fuel injection control is terminated. On the other hand, if the obtained value $t_a$ is greater than zero, the corrective fuel injection time $t_i$ is calculated at a step 848 by using the equation (6).

Although the acceleration correction time for the time interval A is made proportional to $Q_a$ at the step 826 of the above-mentioned embodiment, a fixed value may be used instead of such value $t_a$. In this case, the processing operations of the steps 830 and 832 become the same. In other words, at both the steps 830 and 832, the calculation expressed as equation (6) is conducted.

Figure 23:
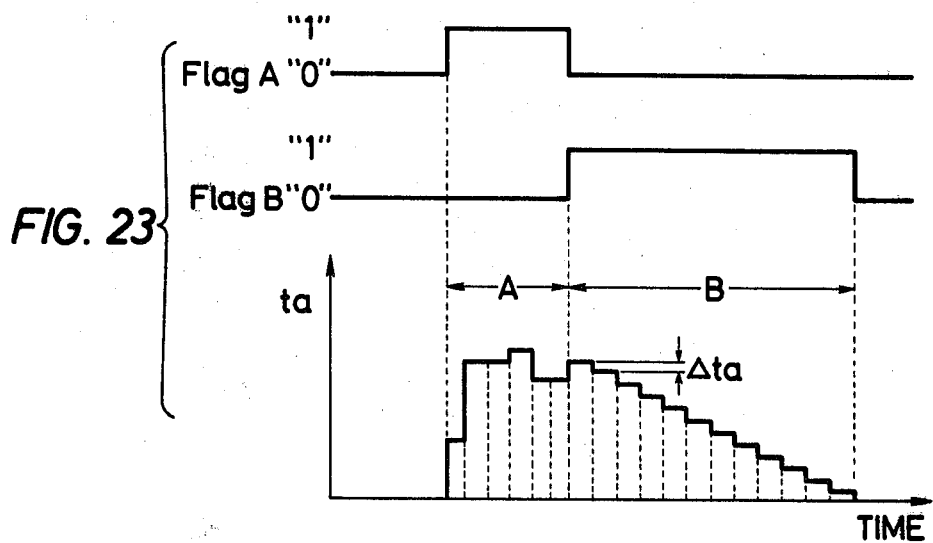
FIG. 23 shows the relationship between the flag bits and correction time.

FIG. 23 illustrates the transitions of the contents of the flag bits $F_A$ and $F_B$, and the change in the acceleration correction time $t_a$ according to the embodiment of the invention.

As can be seen from this figure, the fuel injection time for the acceleration correction is determined in proportion to the increment of the air flow per unit time for the time interval A and is gradually decreased with time for the time interval B. This will meet with the degree of the acceleration of the vehicle requested by the driver, with the result that the performance of the vehicular acceleration can be enhanced.

(4) EGR and NIDL Controls

EGR control is defined as adjusting the value 28 to enable the suitable amount of exhaust recirculating gas to be entered into the intake manifold 26 and NIDL control is defined as adjusting the screw 44 or a value at the idling operation to permit the suitable amount of air to be entered into the intake manifold 26. Both controls are so called a duty control by which the pulse width of an output is changed while the interval of the output pulses remains unchanged. In order to set the data representative of the width of the valve control pulse, registers 420 and 424 are provided. The registers 418 and 422 are provided to set the data indicative of intervals of the output pulses. Since the basic operation of the EGR control is substantially the same as that of the NIDL control the description will be made of the EGR control. By the stage pulse EGRP-P, the register 418 of the first register file 470 and timer 456 of the second register file 456 are selected for operation of the comparison and the incrementer 478 is applied with an increment control signal INC which is produced by means of a logic circuit shown in FIG. 16(D). As a result, the timer 456 counts up the stage pulse EGRP-P and produces an output signal shown at EGR TIMER in FIG. 24. When the count value EGR TIMER becomes equal to or greater than the set value EGRP REG, the latch circuit 536, applied with an output from the comparator 480 through the latch circuit 534, produces a signal shown at EGRPBF in FIG. 24. This signal, EGRPBF, serves together with the pulse EGRD to produce a reset signal at a control stage EGR-P. The timer 456 is commonly used at both the control stages EGR-D and EGR-P. When the count value EGR TIMER of the timer 456 becomes equal to or greater than the set value EGRD REG of the register 420, the comparator 480 produces an output which is applied to a latch circuit 538 and then to a latch circuit 540. The latch circuit 540 delivers an output signal shown at EGR out in FIG. 24. The opening and closing of EGR value are controlled in response to the output signal EGR out thus obtained.

(5) Measurements of the Revolutions of the Engine and the Vehicular Speed

The revolutions per unit time of the engine are measured by counting, for the predetermined period of time, the number of pulses POS-P detected by means of the crank angle sensor mounted on the crankshaft. The measurement of the vehicular speed is performed by counting for the predetermined period of time the output pulses sensed by the vehicular speed sensor. Both the measurements are substantially the same in principle, therefore the description will be made of the measurement of the revolution per minute of the engine.

Figure 25:
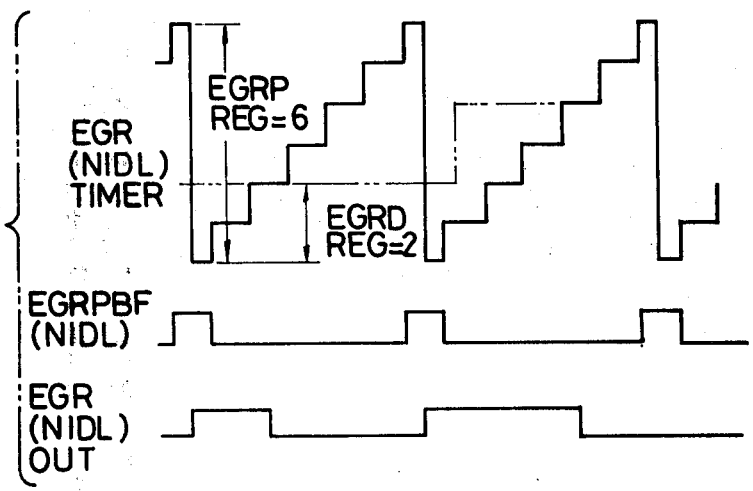

When the stage pulse RPMW-P is delivered from the microstage generator 570, the register 426 of the first register file 470 and the timer 460 of the second register file 472 are selected for operation. Upon the application of the stage pulse RPMW-P to the incrementer control circuit 490, it produces an increment control signal INC by means of a logic circuit shown in FIG. 16(E), and a reset signal RESET by means of a logic circuit shown in FIG. 17(E), both of which are applied to the incrementer 478. As a result, the timer 460 increases its count value RPMW TIMER as shown in FIG. 25. The register 426 is preliminarily set with the number of 7. When the count value RPMW TIMER of the timer 460 becomes equal to or greater than the set value RPMW REG of the register 426, the comparator 480 delivers an output which is applied to the latch circuit 550 and then shifted to the latch circuit 552. Shown at RPMWBF in FIG. 25 is one output of the latch circuit 552 which is applied to the logic circuit shown in FIG. 17(E) for producing the reset signal. Since the output logic circuit 710 shown in FIG. 18 is connected to the output stage of the latch circuit 552, an output pulse RPMWD appears at the terminal 712 of the output logic circuit 710.

When the stage pulse RPM-P is delivered, the counter 462 of the second register file 472 is selected. This counter 462 counts the pulses POS-P between two adjacent stage pulses RPM-P so that the count value RPM COUNT of the counter 462 increases as shown in FIG. 25. The count value RPM COUNT will be transferred to the register 430 of the third register file 474 in synchronism with a control signal MOVE produced by the in incrementer control circuit 490. The set data in the third register file 474 will be transferred by way of the data bus 162 to the CPU 114.

(6) Detection of the Engine Stopping

When the revolutions of the engine become lower than a predetermined value, in other words, that the interval of the reference pulse INTLD becomes greater than the set value ENST REG of the register 410 of the first register file 470, the CPU 114 is informed by an interrupt signal of the fact that the engine will soon stop. In normal operation, the reference pulse INTLD is predetermined in cycle or interval to be less than the set value of the register 410. In the event the CPU 114 receives an interrupt signal indicating that the engine will stop, the CPU 114 generates an instruction signal for the stops of the operation of the fuel pump and other necessary elementary operations.

Figure 26:
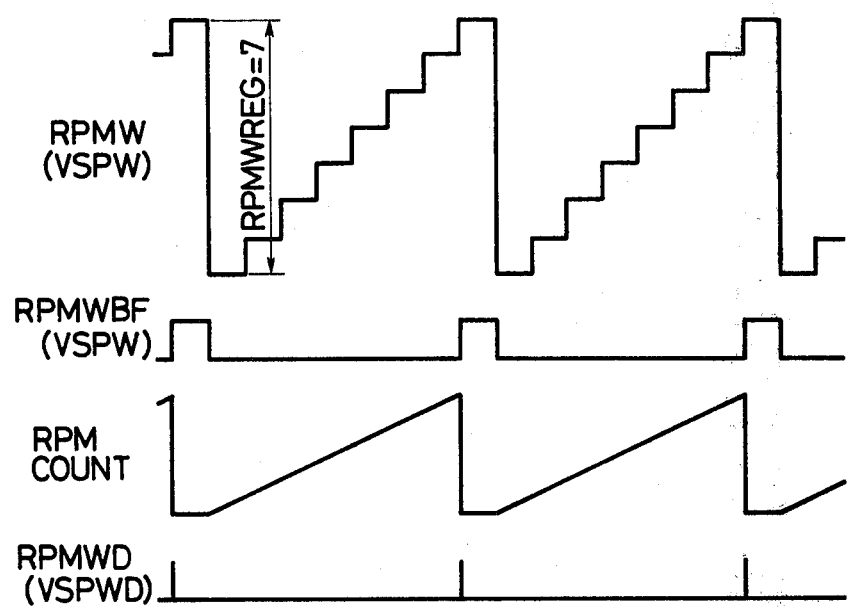
Figure 27:
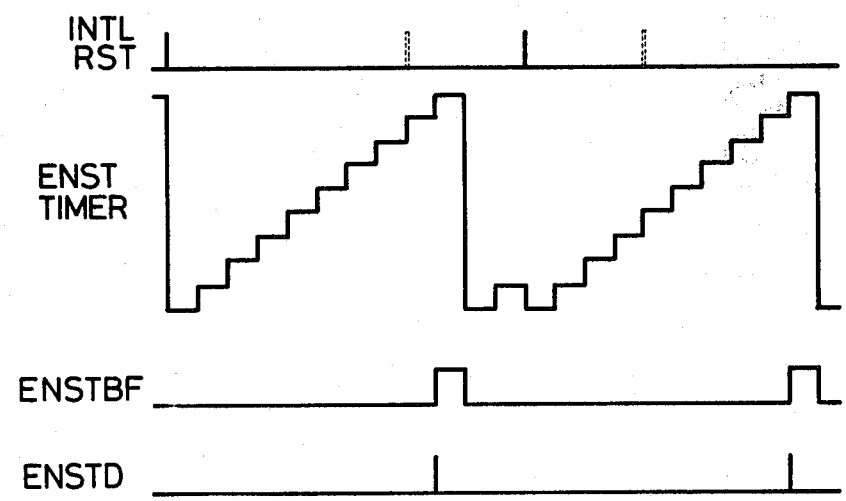

When the microstage generator 570 produces the stage pulse ENST-P, the register 410 of the first register file 470 and the timer 448 of the second register file 472 are selected for operation. At the same time, the incrementer 478 is applied with the stage pulse ENST-P as an increment control signal INC, as shown in FIG. 16(F), and a reset signal RESET produced by means of a logic circuit shown in FIG. 17(F). The timer 448 operates to count up the stage pulses ENST-P so that the count value ENST TIMER varies as shown in FIG. 26. As a consequence, a latch circuit 520 connected to the comparator through the latch circuit 518 delivers an output shown at ENSTBF in FIG. 26. By the connection of the same logic circuit 710 as in FIG. 18 to the output stage of the latch circuit 518, an output pulse ENSTD indicating the condition of the engine stop can be obtained at the terminal 712 of the logic circuit 710. In normal operation, the timer 448 is reset by a pulse INTLRST shown in FIG. 26. This pulse INTLRST is produced with the reference pulse INTLD being made in synchronism with the stage pulse ENST-P. When the engine is near a condition of stopping, the timer 448 is reset by the output ENSTBF of the latch circuit 518 and the above-mentioned pulse INTLRST. The interval between the pulse INTLRST and the output pulse ENSTD is referred to as a so-called ENST time.

Since various changes in the control apparatus embodied in the present invention may be made without departing from its spirit and scope, it is intended that all matters in the above description shall be considered as illustrative and not in a limiting sense.

It should be noted that the various elements discussed above such as the CPU 114, the RAM 116, the ROM 118 and the various registers could readily be constructed and programmed to perform the above-described operations by one of ordinary skill in the art. For example, IC modules of types HD 46802, HM 46810 and HM 45632 all produced by Hitachi, Ltd. can be used for the CPU 114, the RAM 116 and the ROM respectively.

We claim:

1. A method of operating a processor-controlled apparatus for controlling an internal combustion engine, for which a plurality of sensors are provided for producing signals, to be coupled to said processor, indicative of operating conditions of the engine and having activator means for controlling the quantity of fuel to be injected into the internal combustion engine in accordance with data generated by said processor pursuant to a first data processing program executed in response to a first interrupt signal, and input output means coupled to said sensors, said processor and said actuator means and including first means for storing data supplied from said processor, second means for counting up pulses supplied thereto, and third means for comparing the data stored by said first means with the count value of said second means to produce an output signal to be applied to said actuator means, said method comprising the step of:
  (a) generating a second interrupt signal in response to a signal sensed by said sensors in accordance with the rotation of the internal combustion engine and thereby causing the execution of a second program, independent of said first program, by way of which data indicative of fuel injection time that has been generated by the processor in accordance with the execution of said first data processing program is set into said first means; and wherein said first interrupt signal is produced in response to a signal which is produced periodically without regard to the rotation of the engine crankshaft, so that there is no prescribed relationship between the initiation of the execution of said first and second programs, whereby the periodic generation of data to be set in said first means indicative of fuel injection time is assured irrespective of the speed of rotation of the engine crankshaft.

2. A method as defined in claim 1, wherein said first data processing program comprises the steps of:
  (b1) detecting, in response to signals produced by one of said sensors, a change $\Delta Q_a$ in the quantity of air passing through an intake manifold;
  (b2) judging if the detected value $\Delta Q_a$ is over a predetermined value; and
  (b3) correcting the generated data to be stored by that first means, so that the fuel injection time becomes longer when the detected value $\Delta Q_a$ is over the predetermined value than when the same is below the predetermined value.

3. A method as defined in claim 2, wherein step (b3) of correcting the data said data processing program first means is performed during the time that the detected value $\Delta Q_a$ is greater than the predetermined value and after the quantity of air sensed reaches a constant value.

4. A method as defined in claim 3, wherein the corrective fuel injection time gradually decreases with time the quantity of air reaches a constant value.

5. A method as defined in claim 1, wherein said data processing program comprises the steps of:
  (b1) detecting, in response to signals produced by one of said sensors, a change $\Delta Q_a$ in the quantity of air passing through an intake manifold;
  (b2) generating first data indicating a corrective fuel injection tim $t_a$ proportional to said detected value $\Delta Q_a$;
  (b3) generating second data indicating a basic fuel injection time $t_p$ from the speed of revolution of the engine crankshaft and the quantity of air passing through an intake manifold, both of which are represented by signals produced by ones of said sensors; and
  (b4) generating third data indicating the sum of the first and second data, which third data is to be said data processing program first means.

6. A method as defined in claim 5, wherein said data processing program further comprises the steps of:
  (b5) judging whether the generated corrective fuel injection time $t_a$ is over a predetermined maximum value $t_a$ max; and
  (b6) in response to $t_a$ max, generating fourth data indicating the sum of the second data and the predetermined maximum value $t_a$ max, which fourth data is said data processing program first means.

7. A method of operating a processor-controlled apparatus for controlling the supply of fuel to an internal combustion engine, said apparatus having sensor means for producing signals representative of operating conditions of the engine, actuator means for controlling the supply of fuel to said engine in response to fuel supply control signals applied thereto, and an input/output unit coupled to receive signals produced by said sensor means and to deliver fuel supply control signals to said actuator means, said processor being coupled to said input/output unit, for carrying out engine control data processing operations including fuel supply control calculations in accordance with signals produced by said sensor means and thereby generating engine control data that are coupled to said input/output unit, said input/output unit including first means for generating an engine control timing signal pattern through which operational events of said engine are controlled, second means for storing said engine control data, third means, coupled to said first means, for generating respective engine timing codes the values of which are selectively modified by said engine control timing pattern, fourth means, coupled to said second and third means, for comparing respective ones of said engine control data with respective ones of said engine timing codes and producing respective output signals when said respective engine control data define a prescribed relationship with respect to said engine timing codes, and fifth means, coupled to said fourth means, for producing a control signal to be coupled to said actuator means in response to an output signal produced by said fourth mean, and wherein said second means includes means for storing engine control data representative of the duration of the supply of fuel to said engine, and said sensor means include means for generating timing pulses in accordance with the rotation of the engine crankshaft, said timing signal pattern being produced independently of said timing pulses generated by said sensor means;

said method comprising the steps of:

(a) in response to one of the timing signals of said engine control timing signal pattern, generating a first interrupt signal and thereby causing said processor to execute a first program for carrying out said fuel supply control calculations and generating engine control data; and (b) in response to the generation of timing pulses by said sensor means, generating a second interrupt signal and thereby causing said processor to execute a second program, independent of said first program, by way of which said processor supplies said engine control data representative of the duration of the supply of fuel to said engine; and whereby the periodic generation of data to be supplied to said second means is assured irrespective of the speed of rotation of the engine crankshaft.

8. A method according to claim 7, wherein said second means includes means for storing an engine control data representative of a preselected interval of time, said third means includes for generating an engine timing code the value of which is selectively modified by said one of said timing signals of said engine control timing signal pattern, said fourth means producing a first interrupt-representative output signal in response to said engine control data representative of a preselected period of time defining said prescribed relationship with respect to said engine timing code the value of which is selectively modified by said one of said timing signals; and wherein said input/output unit further includes means for coupling said first interrupt-representative output signal to said processor, in response to which first interrupt-representative output signal said step (a) is carried out.

9. A method according to claim 8, wherein said second means includes means for storing engine control data representative of a preselected displacement of the engine crankshaft during which said timing pulses are generated, said third means includes means for generating an engine timing code the value of which is modified in response to said timing pulses, said fourth means producing a second interrupt-representative output signal in response to said engine control data representative of a preselected displacement of the engine crankshaft defining said prescribed relationship with respect to said engine timing code the value of which is modified in response to said timing pulses; and wherein said input/output unit further includes means for coupling said second interrupt-representative output signal to said processor, in response to which second interrupt-representative output signal said step (b) is carried out.

10. A method according to claim 7, wherein said sensor means include means for producing a signal representative of the quantity $Q_a$ of air passing through the intake manifold of the engine, and wherein step (a) includes the steps of (a1) detecting a change $\Delta Q_a$ in the quantity of air passing through the intake manifold, (a2) determining if said change $\Delta Q_a$ exceeds a predetermined value $\Delta Q_{ac}$, and (a3) controlling the value of said engine control data representative of the duration of the supply of fuel to said engine so that the duration of the supply of fuel to the engine is increased in response to the value of $\Delta Q_a$ exceeding said predetermined value $\Delta Q_{ac}$, but remains unchanged in response to the value of $\Delta Q_a$ not exceeding said predetermined value $\Delta Q_{ac}$.

11. A method according to claim 10, wherein step (a3) is carried out over a first interval of time during which the value $\Delta Q_a$ is detected as being greater than said predetermined value $\Delta Q_{ac}$ and over a second interval of time subsequent to the time at which the quantity of air $Q_a$ passing through the intake manifold reaches a constant value.

12. A method according to claim 11, wherein the value of the engine control data controlled in step (a3) is such as to gradually decrease the duration of the supply of fuel to the engine subsequent to the time at which the quantity of air $Q_a$ passing through said intake manifold reaches a constant value.

13. A method according to claim 7, wherein said sensor means include means for producing a signal representative of the quantity $Q_a$ of air passing through the intake manifold of the engine, and wherein step (a) includes the steps of (a1) detecting a change $\Delta Q_a$ in the quantity of air $Q_a$ passing through the intake manifold, (a2) generating first data representative of a corrective fuel supply duration time $t_a$ in accordance with the value of said detected change $\Delta Q_a$, (a3) generating second data representative of a basic fuel supply duration time $t_p$ in accordance with the rotational speed of the engin crankshaft and the quantity of air $Q_a$ passing through the intake manifold, and (a4) generating third data representative of the sum of said first and second data and producing therefrom said engine control data representative of the duration of the supply of fuel to said engine.

14. A method according to claim 13, wherein step (a) further includes the steps of (a5) determining whether the generated first data exceeds a predetermined maximum value $t_a$ max, and (a6) in response to said generated first data $t_a$ exceeding said value $t_a$ max, generating fourth data representative of the sum of said second data $t_p$ and said predetermined maximum value $t_a$ max, and producing therefrom said engine control data representative of the duration of the supply of fuel to said engine.

15. A method according to claim 10, wherein step (a3) comprises the steps of (a3-1) generating first data representative of a corrective fuel supply duration time $t_a$ in accordance with the value of said detected change $\Delta Q_a$, (a3-2) generating second data representative of a basic fuel supply duration time $t_p$ in accordance with the rotational speed of the engine crankshaft and the quantity of air $Q_a$ passing through the intake manifold, and (a3-3) generating third data representative of the sum of said first data and second data and producing therefrom said engine control data representative of the duration of the supply of fuel to said engine.

16. A method according to claim 15, wherein step (a3) further includes the steps of (a3-4) determining whether the generated first data exceeds a predetermined maximum value $t_a$ max, and (a3-5) in response to said calculated first data $t_a$ exceeding said value $t_a$ max, generating fourth data representative of the sum of said second data $t_p$ and said predetermined maximum value $t_a$ max, and producing therefrom said engine control data representative of the duration of the supply of fuel to said engine.

17. A method according to claim 11, wherein step (a3) comprises the steps of (a3-1) setting, into a first prescribed location in memory within said processor, data indicative of whether or not there is a correction of fuel supply duration time for said first interval of time, and (a3-2) generating data representative of fuel supply duration time from which the engine control data representative of the duration of the supply of fuel to the engine is derived in response to the value of data set in step (a3-1).

18. A method according to claim 17, wherein step (a3) further comprises the steps of (a3-3) setting, into a second prescribed location in memory within said processor, data indicative of whether or not there is a correction of fuel supply duration time for said second interval of time, and (a3-4) generating data representative of fuel supply duration time from which the engine control data representative of the duration of the supply of fuel to the engine is derived in response to the value of data set in step (a3-3) such that the duration of the supply of fuel to the engine is gradually decreased for said second interval of time.

* * * * *